Jan. 30, 1940.   R. H. CRAMER ET AL   2,188,675
GRINDING MACHINE
Filed Feb. 9, 1938    13 Sheets-Sheet 3

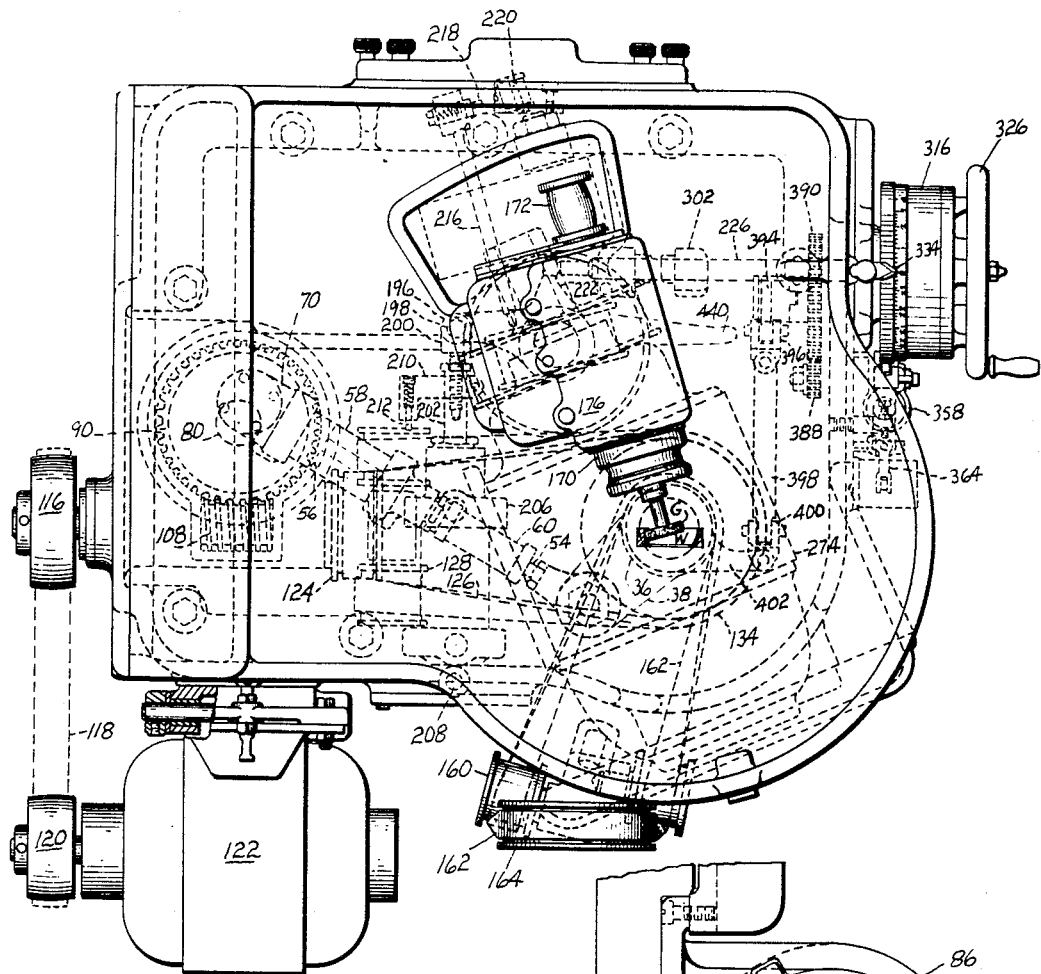

INVENTORS:
RAYMOND H. CRAMER,
PHILIP H. HUTCHINSON,
BY
Gales P. Moore
THEIR ATTORNEY.

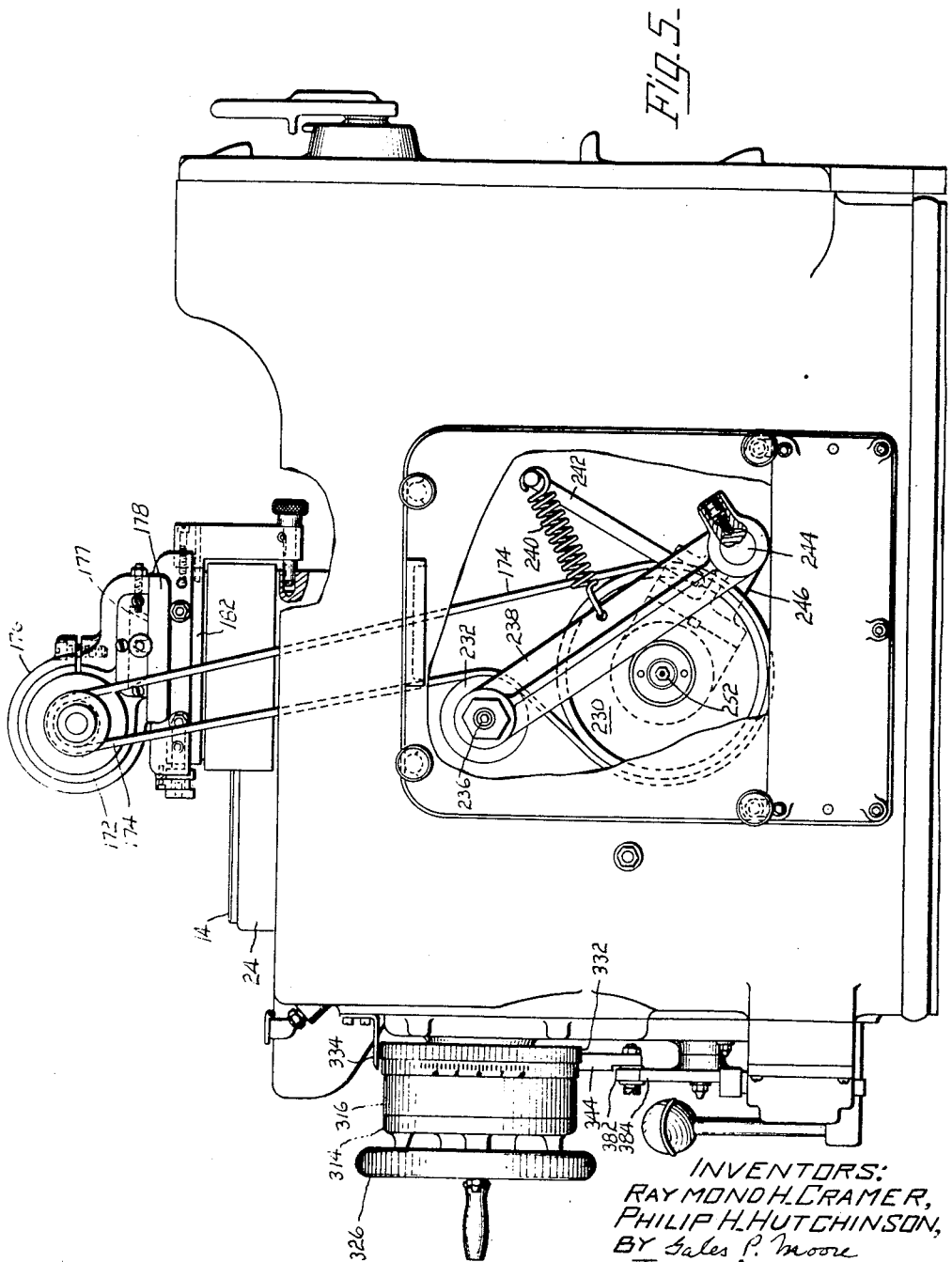

Jan. 30, 1940.  R. H. CRAMER ET AL  2,188,675
GRINDING MACHINE
Filed Feb. 9, 1938  13 Sheets-Sheet 5
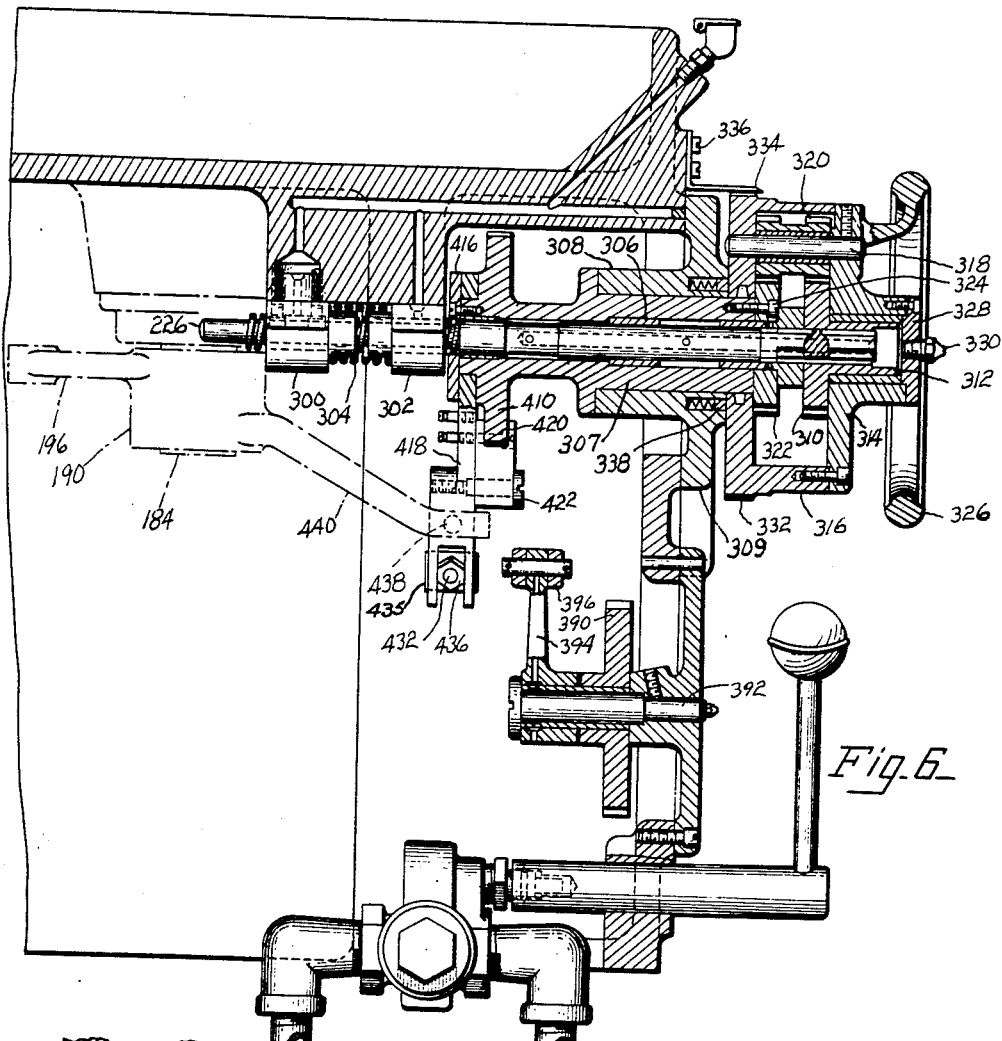
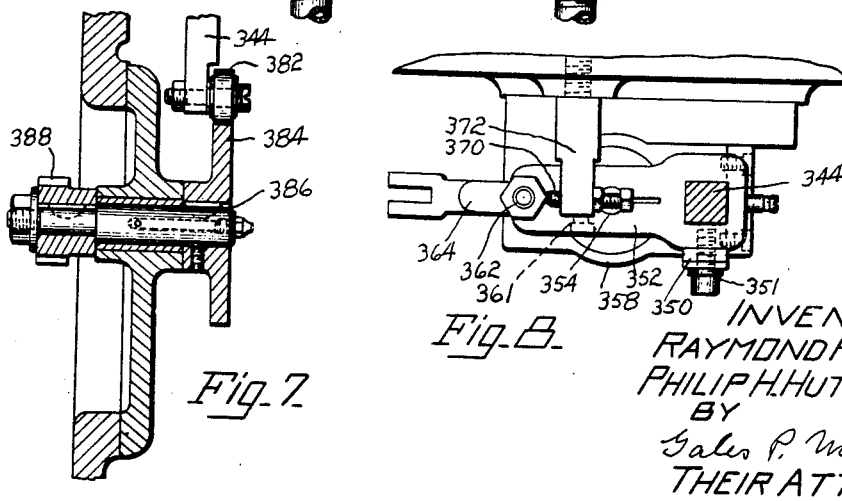
INVENTORS:
RAYMOND H. CRAMER,
PHILIP H. HUTCHINSON,
BY
Gales P. Moore
THEIR ATTORNEY.

INVENTORS:
RAYMOND H. CRAMER,
PHILIP H. HUTCHINSON,
BY
Sales P. Moore
THEIR ATTORNEY.

Jan. 30, 1940.   R. H CRAMER ET AL   2,188,675
GRINDING MACHINE
Filed Feb. 9, 1938   13 Sheets-Sheet 8

INVENTORS:
RAYMOND H. CRAMER,
PHILIP H. HUTCHINSON,
BY
Gales P. Moore
THEIR ATTORNEY

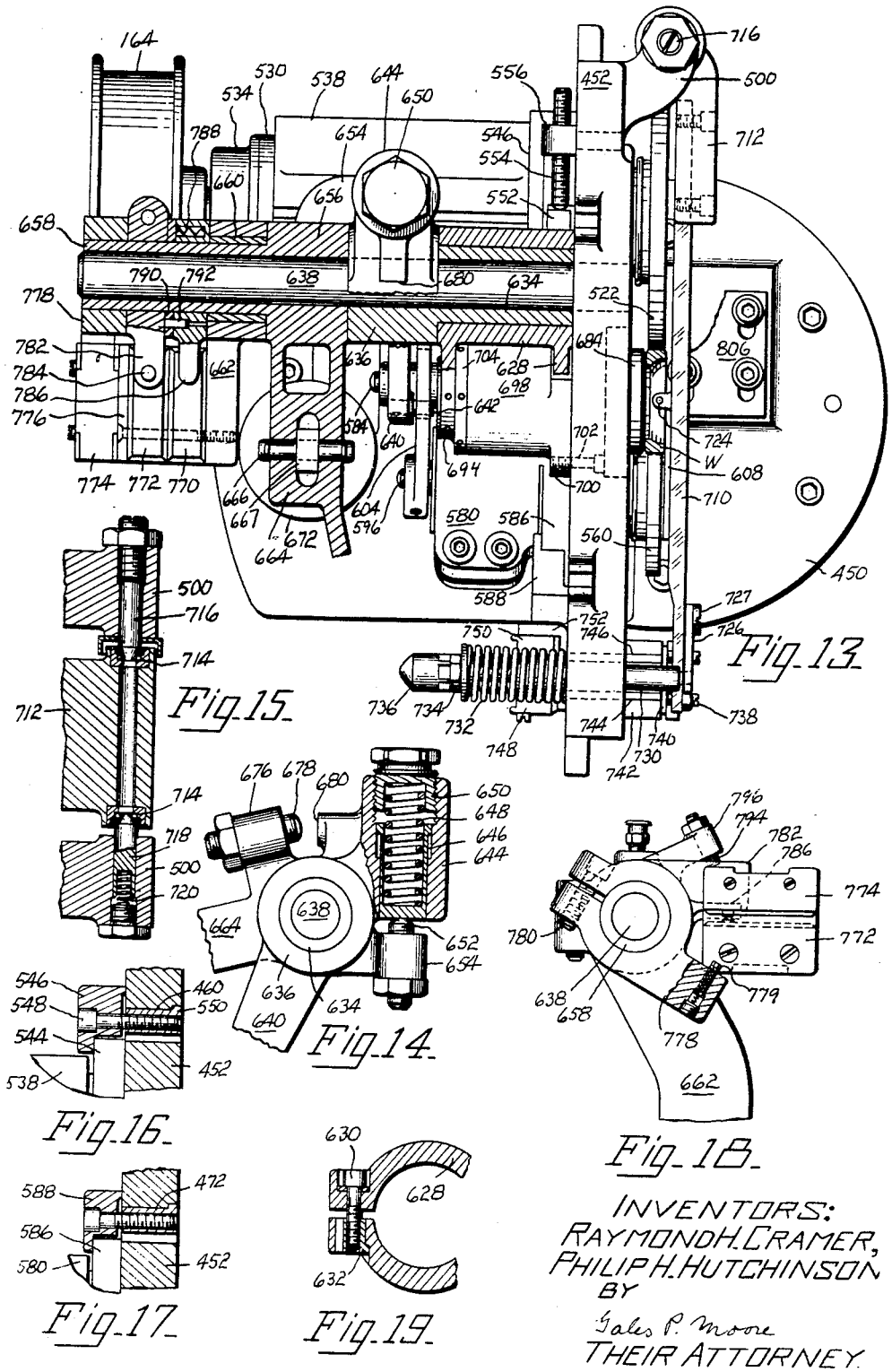
Jan. 30, 1940. R. H. CRAMER ET AL 2,188,675
GRINDING MACHINE
Filed Feb. 9, 1938 13 Sheets-Sheet 9
INVENTORS:
RAYMOND H. CRAMER,
PHILIP H. HUTCHINSON
BY
Gales P. Moore
THEIR ATTORNEY.

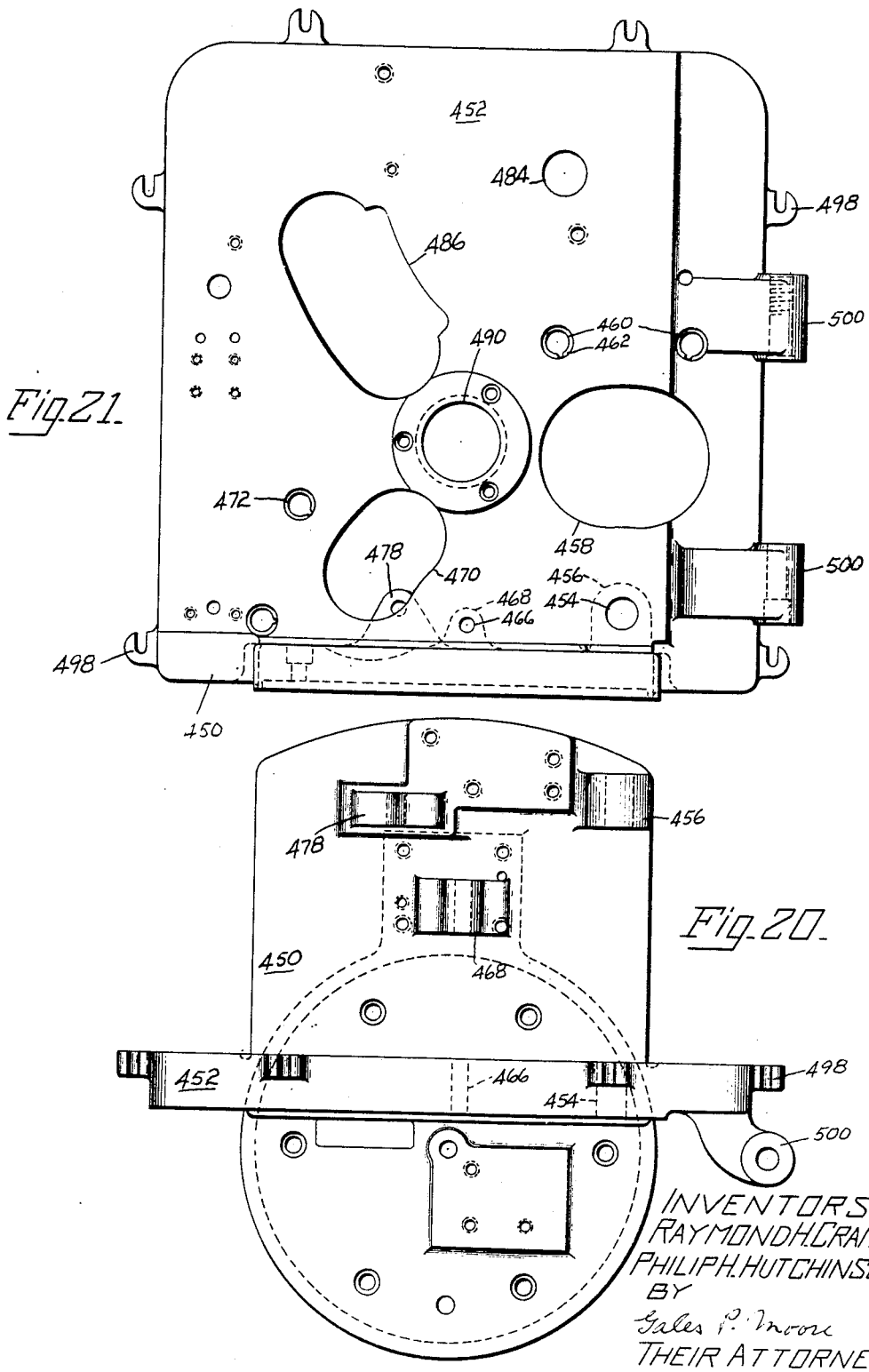

Jan. 30, 1940.     R. H CRAMER ET AL     2,188,675
GRINDING MACHINE
Filed Feb. 9, 1938     13 Sheets—Sheet 11

INVENTORS:
RAYMOND H. CRAMER,
PHILIP H. HUTCHINSON,
BY
Gales P. Moore
THEIR ATTORNEY.

Jan. 30, 1940.    R. H CRAMER ET AL    2,188,675
GRINDING MACHINE
Filed Feb. 9, 1938    13 Sheets-Sheet 12

INVENTORS:
RAYMOND H. CRAMER,
PHILIP H. HUTCHINSON,
BY
Gales P. Moore
THEIR ATTORNEY.

Jan. 30, 1940.  R. H CRAMER ET AL  2,188,675
GRINDING MACHINE
Filed Feb. 9, 1938   13 Sheets-Sheet 13

INVENTORS:
RAYMOND H. CRAMER,
PHILIP H. HUTCHINSON,
BY
Gales P. Moore
THEIR ATTORNEY.

UNITED STATES PATENT OFFICE 2,188,675

GRINDING MACHINE

Raymond H. Cramer, Newark, and Philip H. Hutchinson, Montclair, N. J., assignors to General Motors Corporation, Detroit, Mich., a corporation of Delaware Application February 9, 1938, Serial No. 189,612

54 Claims. (Cl. 51—97)

This invention relates to grinding machines and comprises all of the features of novelty herein disclosed. An object of the invention is to provide improved mechanism for generating a surface of revolution on a work-piece, especially a curved internal surface on a hollow work-piece or ring. Another object is to provide improved mechanism for effecting relative oscillation between a work head and a wheel head and automatically changing the field of oscillation, as to effect separation of work and wheel and dressing of the wheel. Another object is to provide improved mechanism for bringing a grinding wheel and a work-piece into operative relation and controlling the relative approach thereof. Another object is to provide an improved sizing device and associated parts for controlling the various operations in a machine cycle. Still other objects are to provide improved mechanism for supporting, rotating, loading and unloading work. Yet other objects are to provide improved mechanism for driving the work and wheel spindles of an oscillating grinding machine.

To these ends and also to improve generally upon machines of this character, the invention consists in the various matters hereinafter described and claimed. In its broader aspects, the invention is not necessarily limited to the specific construction selected for illustrative purposes in the accompanying drawings in which Fig. 1 is chiefly a vertical section with parts broken away and in section and with the work head removed.

Fig. 2 is a plan view with the work head removed.

Fig. 3 is partly a plan view and partly a sectional view of a portion of the mechanism for oscillating the work head and driving the regulating wheel.

Fig. 5 is a side elevation chiefly relating to the wheel driving mechanism, a portion of the frame being broken away.

Fig. 6 is a vertical sectional view of a portion of the mechanism for controlling advance of the grinding wheel.

Fig. 7 is a sectional view of a feed cam and associated parts.

Fig. 8 is a plan view, with a part in section, of the mechanism for controlling a feed pawl.

Fig. 13 is chiefly a plan view of the work head, some parts being broken away and some in section.

Fig. 14 is a detail view, partly in section, of a lost motion device for actuating the work handling devices.

Fig. 15 is a sectional view of the hinge for the gauge.

Figs. 16 and 17 are sectional views showing respectively, the clamping devices for the regulating wheel unit and the supporting idler unit.

Fig. 18 is a detail view, partly in section, of switch controlling means.

Fig. 19 is a detail sectional view of a portion of the pressure idler carrying arm of Fig. 25.

Fig. 20 is a plan view of the work head supporting frame or base.

Fig. 21 is an end view of Fig. 20.

Figure 22:
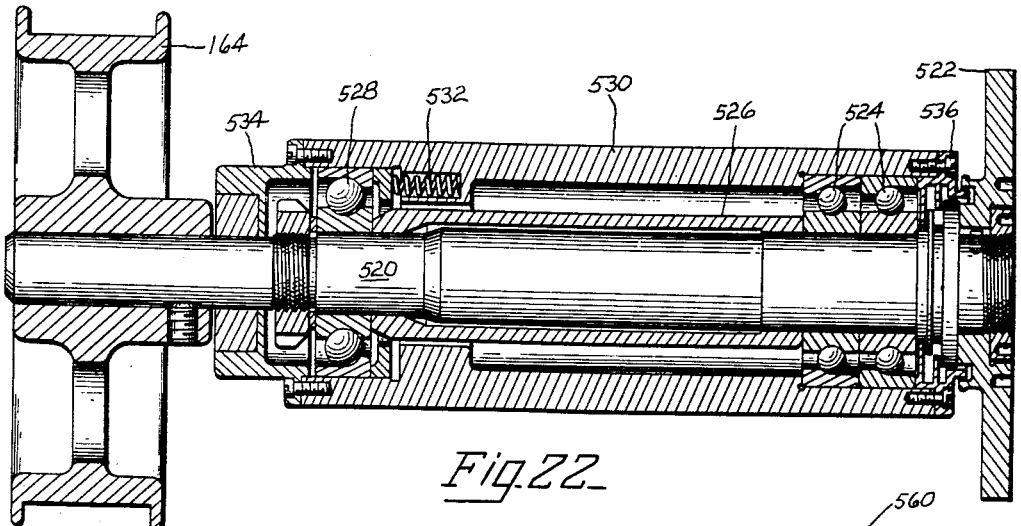
Figure 23:
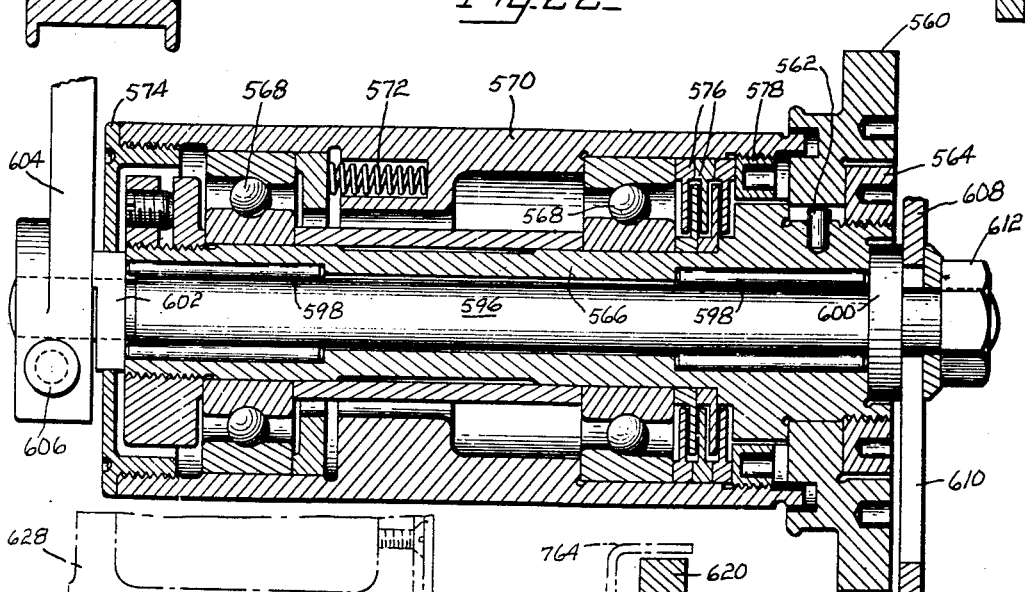
Figure 24:
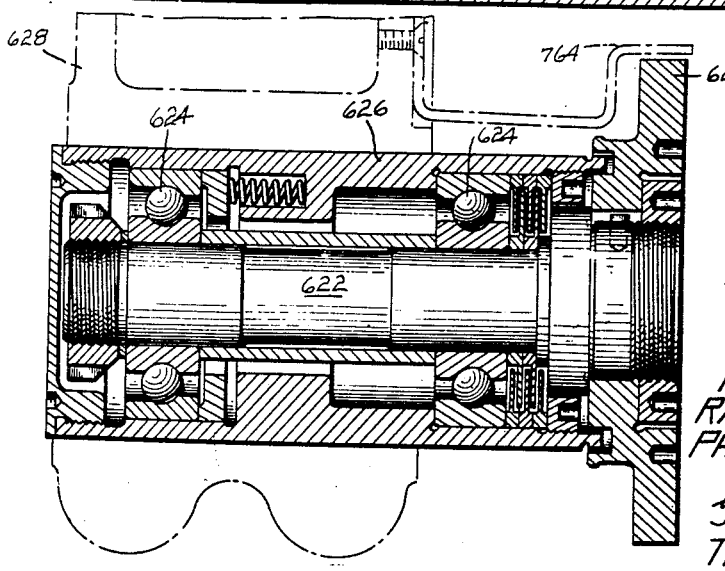

Figs. 22, 23, and 24, are, respectively, sectional views of portions of the regulating wheel unit, the supporting idler unit, and the pressure idler unit.

Figure 25:
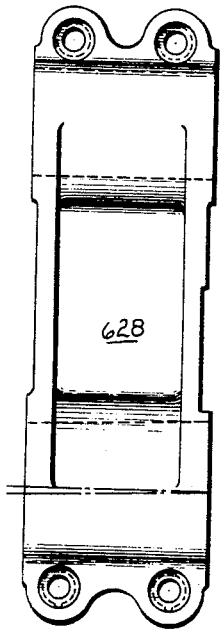

Fig. 25 is a front view of the pressure idler carrying arm.

Figure 26:
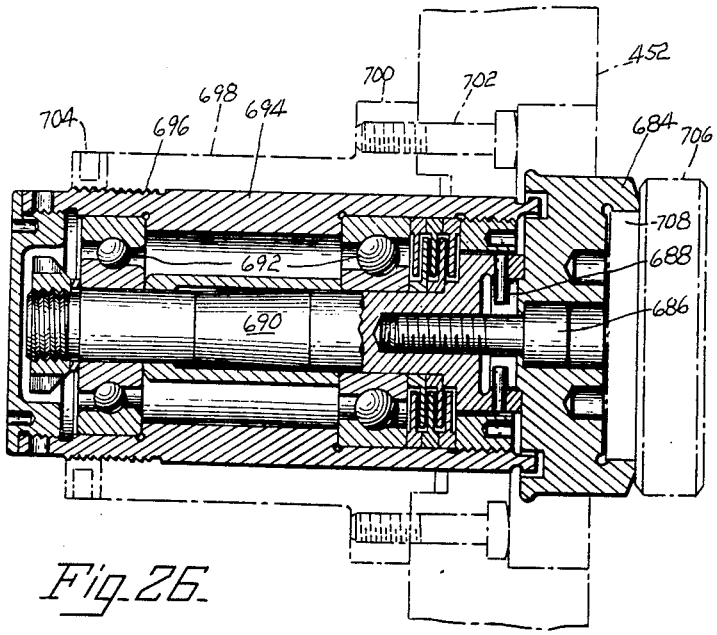

Fig. 26 is a sectional view of the thrust roller unit.

Figure 27:
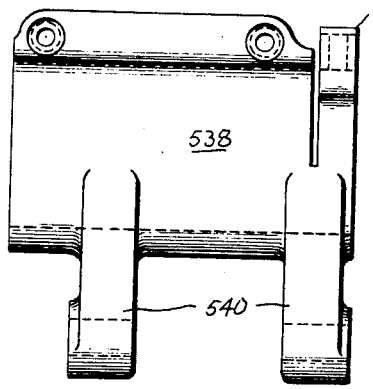

Fig. 27 is a front view of the pivoted head for the regulating wheel unit.

Figure 28:
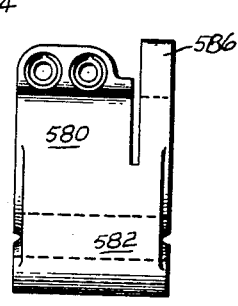

Fig. 28 is a front view of the pivoted head for the supporting idler unit.

Figure 29:
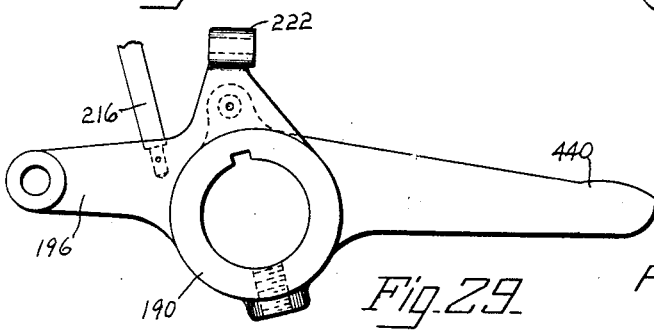

Fig. 29 is a plan view of lever arms pertaining to wheel head actuation.

Figure 30:
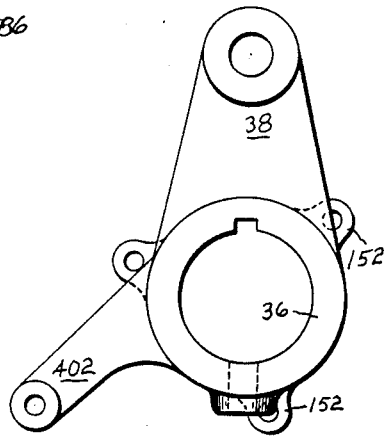

Fig. 30 is a plan view of lever arms pertaining to work head actuation.

Figures 31, 32:
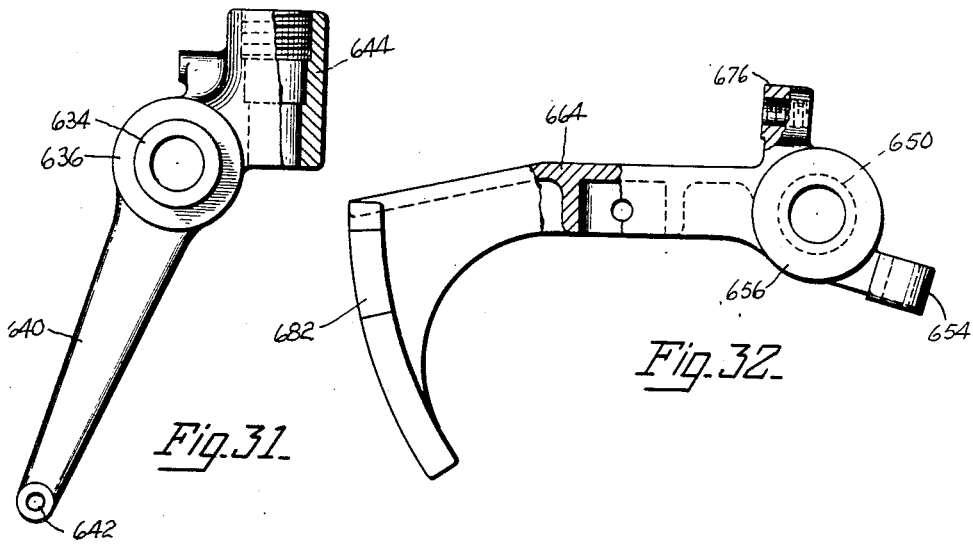

Fig. 31 is a detail view, partly in section, of an ejector operating lever.

Fig. 32 is a detail view, partly in section, of a gauge actuating lever.

Figure 33:
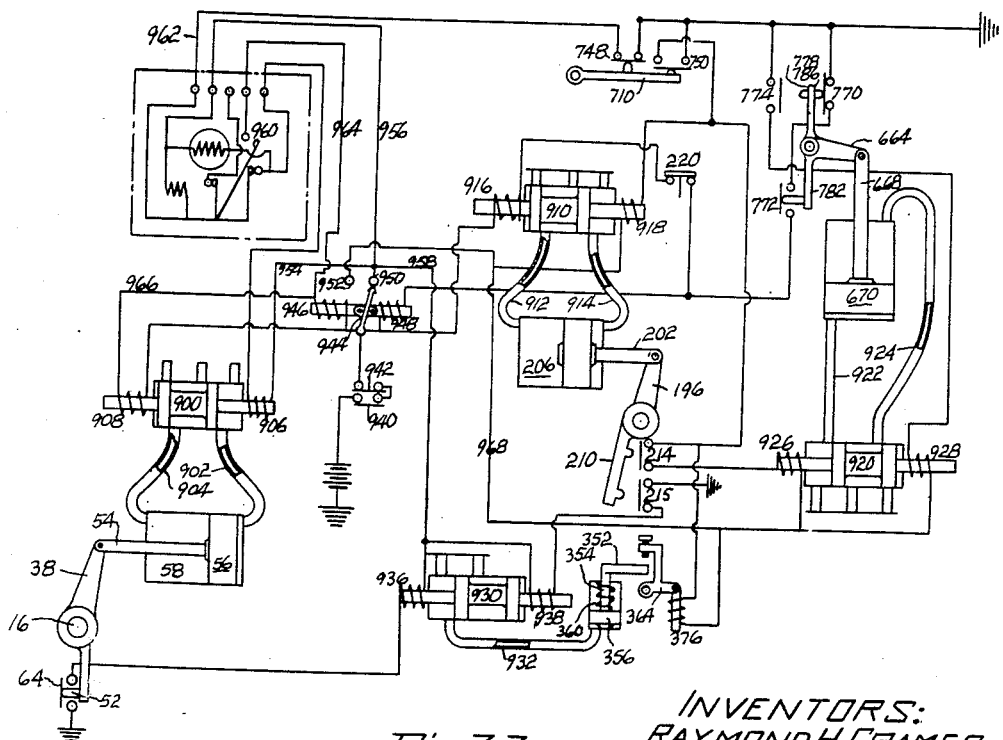

Fig. 33 is a diagram of the fluid pressure and electrical system.

First outlining the general operation, a workpiece (such as an outer bearing race ring having a spherical segmental raceway to be ground) is rotated around its axis in a suitable work head which is oscillated about another axis in line with the center of curvature. A grinding wheel is rotatably mounted in a head which oscillates around an axis, such oscillation not being continuous however but being provided to swing the wheel into the work and then feed it against the work, first with a coarse feed and finally with a fine feed. A gauge movably supported on the work head engages the surface being ground and successively operates electric circuits which control wheel dressing and feed. When the first circuit is operated, the work head changes its place of oscillation through the action of a cylinder and piston unit which forms part of an extensible linkage in the oscillating mechanism. This swings the work away from the grinding wheel and brings a dressing tool on the work head into operative position for oscillation across the wheel, the feed mechanism becoming idle during dressing. The dressing period is controlled by a timing switch after which the work swings back to its initial place of oscillation and continues to be ground with a fine feed of the wheel. When the second circuit is operated by the gauge, the feed ceases and the grinding wheel is swung out of the work. Also the gauge is retracted from the work and the finished work ejected while a new piece is applied to the work head. As the grinding wheel is swung out of the work, compensation of its feed mechanism for stock removal is effected in order to make ready for grinding the new piece. The grinding wheel head is swung by a piston and cylinder unit, first rapidly against a stop to bring the wheel close to the work. Then the stop recedes to control coarse feed followed by slower recession to control fine feed.

The work head which is preferably of the chuckless type hereinafter described is mounted on a base plate secured by bolts 2 to a flange 14 on an upright oscillating shaft 16. The shaft is journalled near the top in a ball bearing 18 engaging an angular contact race ring 20 and a two point contact race ring 22, the latter being bolted over an opening in the main frame. A skirt or shield 24 protects the bearings. Another portion of the shaft is journalled in a ball bearing 26 whose inner race ring is clamped on the shaft against a shoulder and whose outer race ring is slidable in the frame and urged downwardly by coil springs 28 engaging a washer 30. The spring preloads the bearings to avoid deflection by working loads. A cap 32 carrying a suitable seal 34 is bolted to the frame under the bearing. A sleeve 36 having a crank arm 38 is keyed to the shaft at 40 and secured by a set screw 42.

Figure 4:
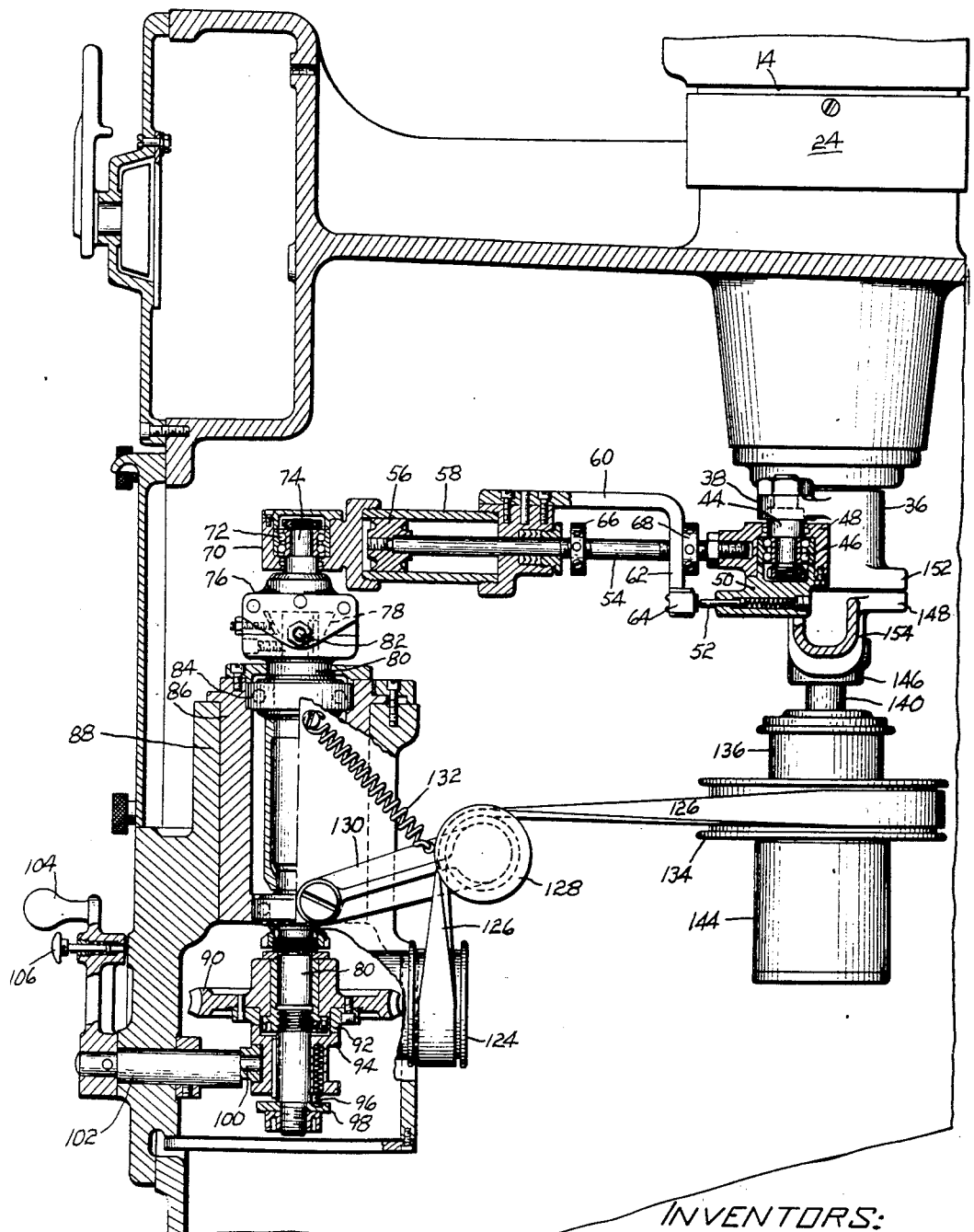
Fig. 4 is chiefly a vertical section of the mechanism for oscillating the work head and driving the regulating wheel.

The crank arm 38 (Fig. 4) carries a shouldered pin 44 supporting a double row ball bearing 46 on which is journalled a casing 48 having a removable bottom cover plate 50 which supports a spring-pressed switch-controlling plunger 52. Threaded in the casing 48 is the end of a piston rod 54 having a piston 56 operating in a cylinder 58. A bar 60 is bolted to the cylinder head and has a depending arm 62 supporting a switch 64, the arm being shiftable along the piston rod between adjustable stop nuts 66 and 68 which govern the stroke. The cylinder 58 has its other head formed as a casing 70 containing a ball bearing 72 supported on a crank pin 74 projecting upwardly from a slide 76 which is shiftable on a dove-tailed slideway 78 carried by a rotating shaft 80. A screw 82 serves to adjust the slide to control the throw of the crank pin and the amplitude of oscillation of the work head.

The rotary shaft 80 is journalled upon ball bearings 84 supported in a flanged sleeve 86 clamped in a hollow bracket 88 on the frame. A worm wheel 90 is journalled on the shaft 80 between thrust collars and carries a clutch plate 92 cooperating with a clutch spool 94 which is keyed to the shaft and urged upwardly into clutching position by coil springs 96 abutting against a washer 98. The clutch spool 94 is manually controllable by a roller on an eccentric pin 100 at the end of a rockable shaft 102 having a handle 104 arranged to be locked by a spring pressed plunger 106. The worm gear 90 is driven (Figs. 2 and 3) by a worm 108 on a shaft 110 journalled on preloaded ball bearings 112 and on a floating bearing 114 supported slidably in the bracket 88. The shaft has a driven pulley 116 outside the frame driven by a belt 118 from a driving puley 120 on the shaft of a motor 122. The inner end of the shaft also carries a pulley 124 for driving the rotary regulating wheel of the work head as will appear.

Figure 1:
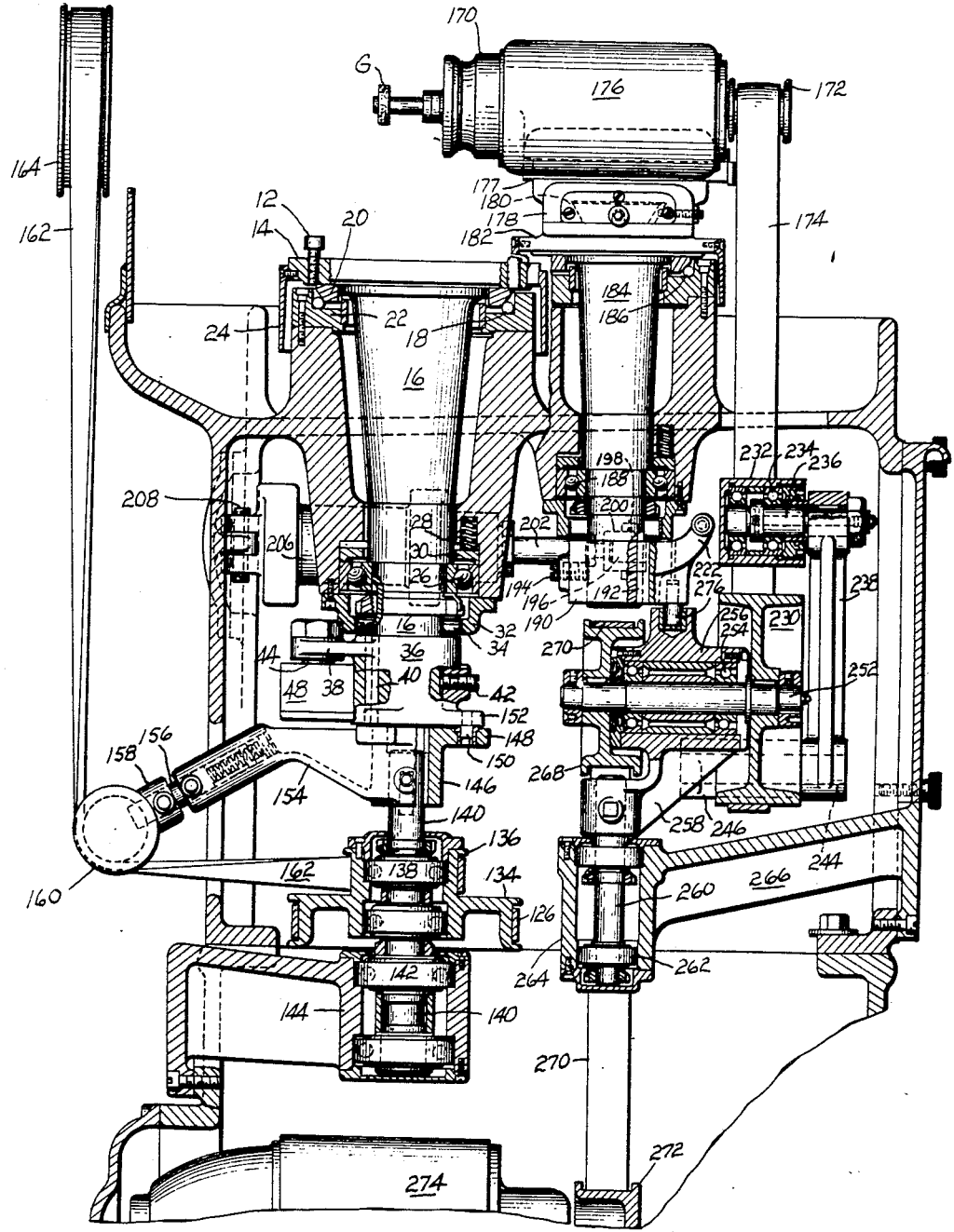

A belt 126 (Fig. 4) is wrapped around the pulley 124 and extends upwardly and around idler pulleys 128 journalled on a swinging arm 130 urged upwardly by a coiled spring 132. The belt 126 extends around a large pulley 134 which is integral with a smaller pulley 136. These pulleys are journalled for rotation (Fig. 1) upon ball bearings 138 carried by a vertical shaft 140 which is journalled for oscillation in ball bearings 142 supported in a bearing bracket 144 fastened to the frame. The shaft 140 is in vertical alignment with the oscillating shaft 16 and is connected to it for oscillation therewith, the upper end of shaft 140 being keyed to a hub 146 which has lugs 148 provided with pins 150 connecting it to similar lugs 152 on the sleeve 36. The hub 146 is part of an arm 154 which is provided with a guide for a spring pressed plunger 156 on a head 158 which rotatably supports a pair of idler pulleys 160. A belt 162 extends around the idler pulleys from the pulley 136 and then runs upwardly around a pulley 164 which drives the regulating wheel of the work head, as will appear. It will be noted that this belt driving mechanism will not interfere with oscillation of the work head because the pulleys 134 and 136 are coaxial with the connnected oscillating shafts 16 and 140 and oscillate with them.

The grinding wheel G has its spindle rotatably mounted in a quill 170 and driven by a pulley 172 and a belt 174. The quill 170 is clamped in a head 176 which can be longitudinally adjusted on a dovetailed slide 177 carried by a cross slide 178 which is adjustable crosswise on a dovetail guide 180 secured to a flange 182 on an oscillating shaft 184. The shaft is supported for oscillation in bearings 186 and 188 mounted and enclosed in the same manner as the bearings for the oscillating work head shaft 16. A sleeve 190 (Figs. 1 and 29) is keyed at 192 to the lower end of the shaft 184 and is secured thereon by a set screw 194. The sleeve has a crank arm 196 secured by a pivot pin 198 (Figs. 1 and 2) to a forked bolt 200 threaded in the end of a piston rod 202 projecting from a piston in a cylinder 206 which has its head pivoted by a pivot pin 208 to the frame. The piston rod, for purposes which will appear, carries a bar 210 with spring pressed plungers 212 to control switches 214 and 215 (Fig. 33) mounted on the cylinder head. Projecting from the crank arm 196 is a bar 216 (Fig. 2) supporting a spring pressed plunger 218 to control a safety switch 220. This last switch prevents operation of the machine when the grinding wheel is worn down to such small diameter that its hub flanges will be in danger of meeting the work surface. It is apparent that, if fluid is admitted into the cylinder 206 near its pivoted end, the piston will be forced outwardly and will swing the grinding wheel into the work. Such swinging movement is temporarily arrested before the grinding wheel actually touches the work by an arm 222 projecting from the sleeve 190 and having a wear piece to abut against the end of a feed screw 226. This feed screw is then rotated by ratchet mechanism as will appear to make it slowly recede and control feeding movement of the wheel into the work.

Before describing the ratchet feed mechanism, the mechanism for driving the grinding wheel spindle will be described. The belt 174 (Figs. 1 and 5) is driven by a pulley 230, one run of the belt being guided by an idler pulley 232 journalled on ball bearings 234 carried by a stud 236 on a pivoted arm 238 which is urged in one direction by a coiled spring 240 anchored to a stud 242. The arm 238 is pivoted on a pin 244 fixed to a bracket 246. The pulley 230 is fixed to a shaft 252 journalled in spaced ball bearings 254 mounted in an oscillating sleeve 256 having a supporting arm 258 fixed to a vertical trunnion 260. The trunnion is in alignment with the oscillating shaft 184 and is journalled in ball bearings 262 carried by a sleeve 264 on a bracket arm 266. The shaft 252 carries a pulley 268 mounted directly over the trunnion 260 and driven by a belt 270 extending upwardly from a pulley 272 keyed to the shaft of a motor 274. The shaft 252 and its pulleys are forced to oscillate with the shaft 184 by means of a pin 276 connecting the sleeve 256 with the oscillated sleeve 190. The bracket 246 which carries the idler pulley supporting arm 238 is mounted on the oscillating sleeve 256 to swing with the latter.

To control the rotation and consequent recession of the feed screw 226 while the arm 222 is urged against the end of the screw by the piston and cylinder unit, the feed screw (Fig. 6) is threaded in a pair of nuts 300 and 302, the first nut being fastened by screws to the frame and the other being urged axially by a coil spring 304 to prevent backlash. The feed screw has a plain portion journalled for rotation in bushings 306 in a sleeve 307 which extends through and is journalled in a boss 308 formed on a bracket 309, the outer end of the screw shaft being splined in a gear 310 having a projecting hub 312 journalled in a cover plate 314 on a rotatable gear-casing 316. The casing and its cover plate carry a pin 318 rotatably supporting connected planet pinions 320, one pinion meshing with the gear 310 and the other meshing with a sun gear 322 fastened by screws 324 to the sleeve 307. Gear 310 is slightly larger than gear 322 and its planet pinion is slightly smaller than the planet pinion which engages the sun gear so that there is a speed reduction. A hand wheel 326 is formed on the cover 314, and a cap 328 with a grease inlet 330 is fastened to the end of the cover. The rotatable gear-casing has ratchet teeth 332 with an adjacent scale for cooperation with a pointer or index plate 334 fastened by screws 336 to the frame. A spring-pressed friction ring 338 set in a recess of the bracket 309 exerts a drag on the casing 316 to prevent turning of the latter when a feed pawl recedes between feed strokes.

Figure 9:
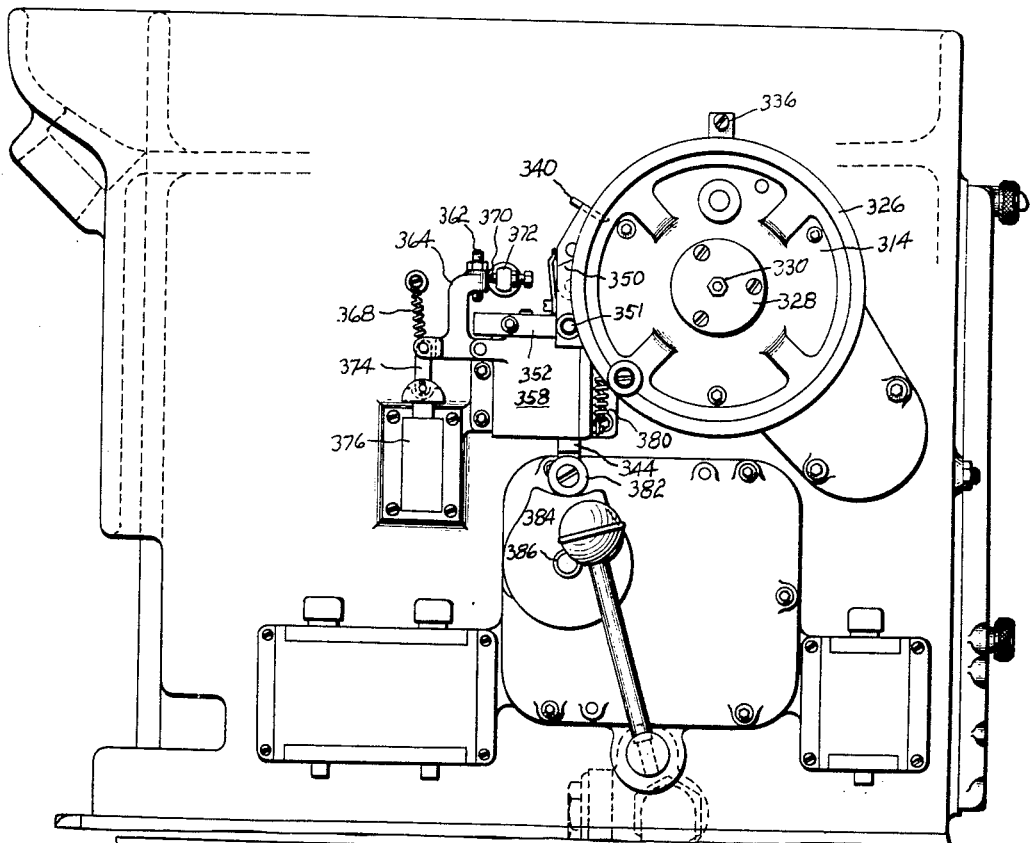
Fig. 9 is an end view of some of the feed mechanism.
Figures 10, 10A:
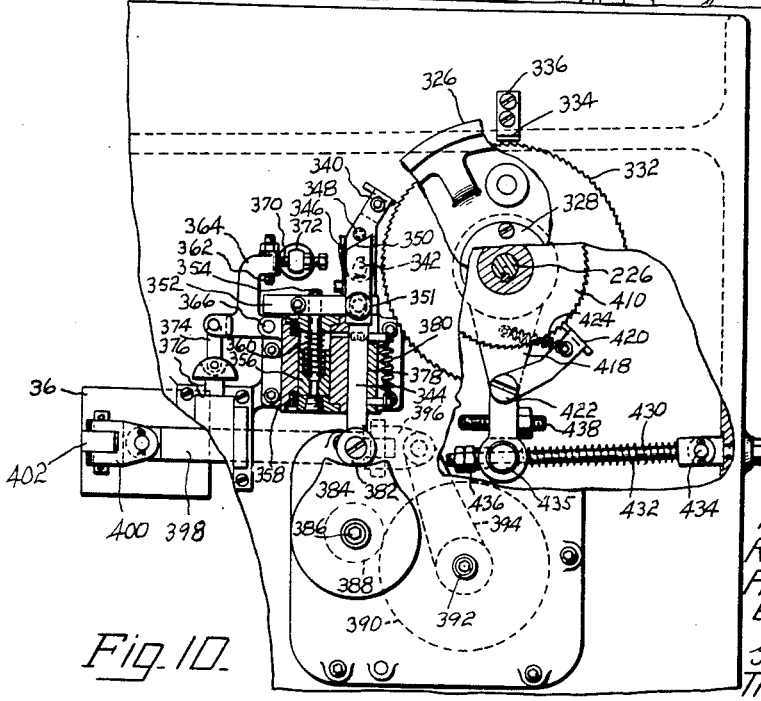
Fig. 10 is a view similar to Fig. 9 with portions broken away and in section.
Fig. 10A is a detail view of portions of the pawl controlling machine.
Figure 11:
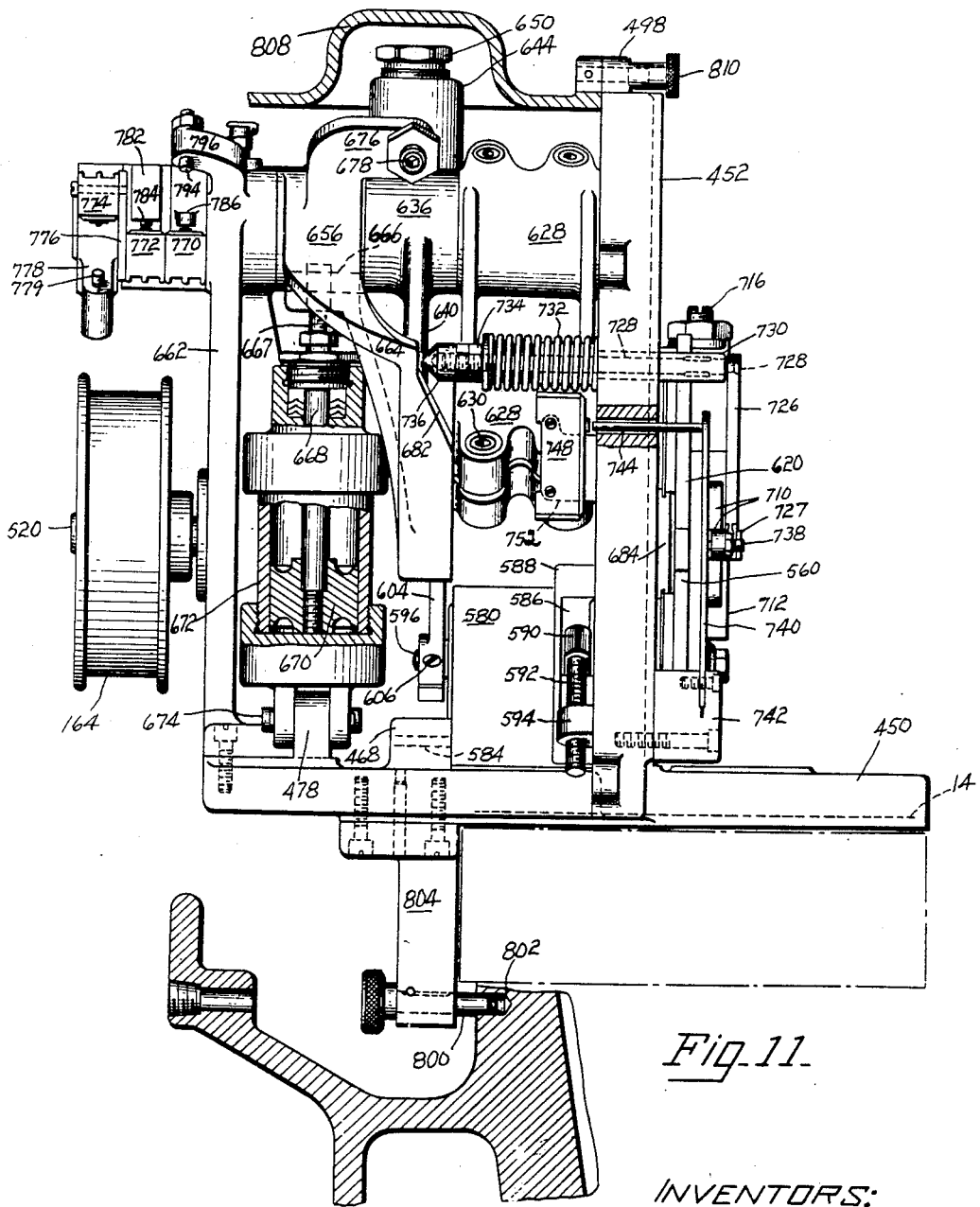
Fig. 11 is a front view of the work head, some parts being broken away and in section.

The pawl 340 (Figs. 9, 10 and 10A) is pivoted at 342 to the enlarged upper end of a vertically reciprocating bar 344 and is urged towards the ratchet teeth by a leaf spring 346 fastened to the bar. The pawl carries a stud 348 adapted to engage a cam 350 on a cam plate which can be located at different elevations to control the effective stroke of the pawl. The cam plate is vertically slotted and adjustably secured by a screw 351 and a washer to a horizontal carrier 352 clamped to a piston rod or plunger 354 having its piston 356 urged downwardly in a cylinder 358 by a coiled spring 360. The carrier (Fig. 8) has a vertical slot so that its opposite sides can be drawn together by a screw 361 and clamped to the piston rod. The bar 344 slides freely through an opening in the carrier 352. For coarse feed, the cam with its carrier and lifting piston remain in the lowered position, thus giving maximum effect to the feed pawl as the latter is reciprocated by the sliding bar 344. For fine feed, the cam and its carrier are lifted by the piston until the carrier 352 is arrested by an adjustable stop screw 362 carried by a lug on a hinged bracket 364 pivoted at 366 to the cylinder. The hinged bracket is urged by a coil spring 368 against an adjustable stop screw 370 threaded in a supporting stud 372 on the frame. To swing the bracket counter-clockwise so that the cam carrier 352 can be elevated its maximum amount to thereby retract the pawl and stop the feed entirely, the bracket is connected by a link 374 to the plunger of a solenoid 376 mounted on the frame.

The pawl-actuating bar 344 is reciprocated vertically independently of the carrier 352 and the cam 350. It passes freely through the carrier and is guided in a guideway 378 formed on the cylinder 358, the bar being urged downwardly by a coil spring 380. The lower end of the bar carries a cam roller 382 hiding on a cam 384 which is keyed to a rock shaft 386 journalled in the frame and having a pinion 388 meshing with a gear 390 journalled for oscillation on a shaft 392. (See Figs. 6, 7 and 10.) The hub of the gear is clutched to the hub of an arm 394 which is connected by a clevis 396 (Figs. 2 and 10) to one end of a link 398, the other end of the link being connected by a clevis 400 to an arm 402 on the sleeve 36 (Figs. 1 and 30) which oscillates with the work head. Thus the pawl reciprocation is controlled by the oscillation of the work head. When the field of oscillation of the work head is changed by the piston-controlled extensible linkage of Fig. 4 as previously described, to provide for dressing the grinding wheel, the feed is stopped because the changed location of the work head acts through the gears 388 and 390 to turn the cam 384 so that the roller 382 rides idly on the arcuate portion of the cam. And when the work head swings back to resume its normal oscillation for grinding, the cam is turned back to its effective position for oscillation under the roller 382.

When, at the conclusion of the grinding operation, the grinding wheel is swung out of the work-piece, the outward swinging of the grinding wheel is made to control a compensation of the feed mechanism for stock removal. This is accomplished by turning back the feed screw 226 in order to stop the swinging-in of the grinding wheel before the latter meets the new work-piece. (See Figs. 6 and 10.) A ratchet wheel 410, whose teeth face in the opposite direction from the ratchet teeth 332, is formed as a part of the sleeve 307 which can turn in the boss 308. Swinging on the hub of the ratchet wheel inside of a retaining collar 416 is an arm 418 on which a pawl 420 is pivoted at 422, the pawl being urged against the ratchet wheel by a coil spring 424. The arm 418 is urged clockwise in Figure 10 by a coil spring 430 which surrounds a rod 432 pivoted to the frame at 434 and extending through an opening in a swivel pin 435 at the end of the arm 418. Nuts 436 threaded on the rod limit swinging of the arm. Near the end of the arm is an adjusting screw 438 lying in the path of an arm 440 (Figs. 2 and 29) carried by the sleeve 190 which is secured to the oscillating shaft of the wheel head. Hence, when the wheel head swings in a direction to move the wheel out of the work at the conclusion of the grinding operation, the arm 440 engages the screw 438 and swings the arm 418 against the tension of the coil spring. This turns the ratchet wheel 410 counter-clockwise together with the attached sun gear 322. The latter rotates the planet pinions 320 and so reverses the feed screw 226. Hence the feed screw is shifted endwise and inwardly ready to stop the wheel head temporarily when the latter again swings the wheel into a new work-piece to repeat the grinding operation.

The work head, as will appear, supports a regulating wheel or roller, a supporting-idler wheel or roller, a pressure-idler wheel or roller, and a thrust wheel or roller all of which rotate and engage the work. The head (Figs. 11 to 28) comprises a base plate 450 bolted to the flange 14 of the oscillating shaft 16 and having one integral upright standard or face plate 452. A hole 454 (Figs. 20 and 21) in the standard or face plate is aligned with a hole in a lug 456 on the base plate to receive a pivot shaft for the regulating unit. The standard has an elongated opening 458 in which the regulating unit can swing for adjustment. Holes 460 with recesses 462 receive threaded bushings which, as will appear, cooperate with a clamp for the swingable head. A hole 466 in the standard is aligned with a hole in a lug 468 on the base plate to receive a pivot shaft for the supporting idler unit which can swing for adjustment in an elongated opening 470. Holes 472 are to receive thread bushings pertaining to a clamp for this unit. A lug 478 on the base plate provides a pivot for a cylinder to swing a pressure-idler unit, such unit swinging about a center at a hole 484 and moving in an elongated opening 486. A hole 490 provides a support for the mounting in which the thrust roller rotates. The edges of the standard or face plate have slotted lugs 498 to which an enclosing cover is attached and the rear edge has offset lugs 500 providing a hinge for a swinging gauge.

Figure 12A:
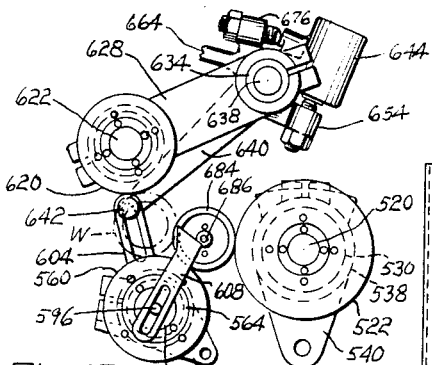
Fig. 12A is a detail view of the work supporting rollers and associated parts in a position to eject a finished piece.
Figure 12:
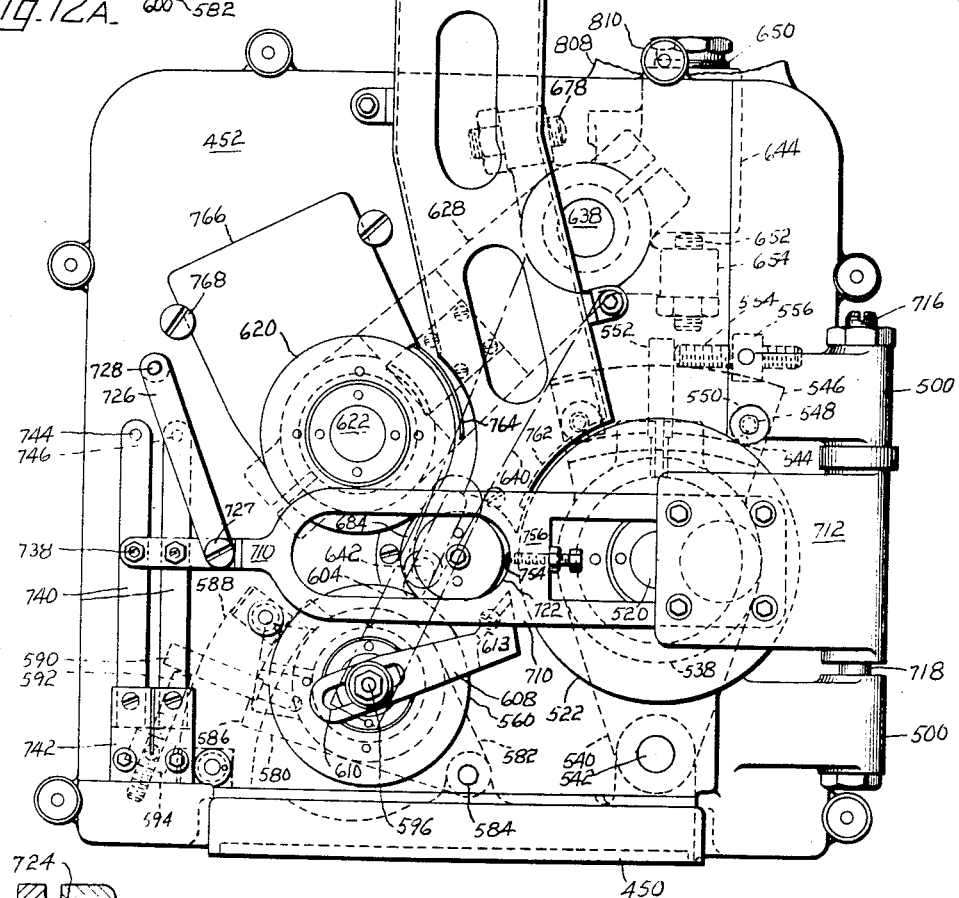
Fig. 12 is an end view of the work head.
Figure 12B:
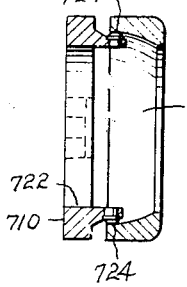
Fig. 12B is a cross sectional view of a workpiece and a gauge.

The pulley 164 (Fig. 22) drives a shaft 520 to which a regulating wheel or roller 522 is attached. The shaft rotates in tandem ball bearings 524 whose inner race rings are spaced by a sleeve 526 from the inner race ring of a bearing 528, the outer race rings being supported in a housing 530 and the bearing 528 having its outer race ring slidably mounted and urged axially by coil springs 532. Caps 534 and 536 are attached to the ends of the housing and form seals. The housing 530 is clamped in a split head 538 (Figs. 12, 12A and 27) having pivot lugs 540 rockable on a pivot shaft 542 supported in the hole 454 and in the lug 456. The head has an arcuate projection 544 at the end next to the standard and this projection is clamped to the standard by a rib on an arcuate clamping plate 546 (Figs. 12, 13 and 16) secured by screws 548 entering threaded bushings 550 which are keyed in the holes 460. The projection 544 carries a stud 552 arranged to abut against an adjusting screw 554 which is threaded in a stud 556 on the standard.

A supporting idler wheel or roller 560 (Fig. 23) is secured by a key pin 562 and a nut 564 to a rotatable sleeve 566 journalled by ball bearings 568 in a housing 570, one of the bearings having its outer race ring urged axially by coil springs 572 to preload the bearings. The housing is closed at one end by a threaded cap 574 and the other end is closed by sealing washers 576 secured by a ring nut 578. The housing is clamped in a split head 580 (Figs. 12, 12A and 28) having an arm 582 rockable on a pivot shaft 584 supported in the hole 466 and in the lug 468. The head has a projection 586 clamped to the standard by an arcuate clamping plate 588 (Figs. 12, 13 and 17) similar to the plate 546. The projection also carries a stud 590 arranged to abut against an adjusting screw 592 threaded in a stud 594 on the standard. The two heads are thus adjustable about the pivot shafts 542 and 584 in order to selectively support different sized work pieces with their centers at the same place, the bearing housings 530 and 570 swinging in the elongated openings of the standard or face plate while only the rollers overhang.

A rockable ejector shaft 596 passes through the supporting idler unit (Fig. 23) and is journalled in roller bearings 598 at the interior of the rotatable sleeve 566. One bearing is guided between a shoulder in the sleeve and a collar 600 on the ejector shaft. The other bearing is guided between a shoulder in the sleeve and a projection 602 on an arm 604 which has its hub clamped by a screw 606 to the ejector shaft. An ejector arm 608 is slotted at 610 and adjustably clamped against the collar 600 by a washer and nut 612. The ejector arm has an ejector 613 (Fig. 12) projecting laterally between the wheels ready to push a finished work-piece forwardly over the supporting idler wheel 560. Actuation of the ejector is effected by the movement of a pressure idler roller as will appear.

A pressure idler roller 620 (Figs. 12, 12A and 24) is secured to a rotatable shaft 622 which is journalled in ball bearings 624 in a housing 626, the construction being similar to that of the supporting idler unit except that the housing 626 is slightly skewed so that the idler roller 620 will urge the work against a thrust roller. The housing 626 is clamped in its slightly skewed position in the lower end of an arm 628 (Figs. 19 and 25) by clamping screws 630 engaging threaded bushings 632. The upper end of the arm 628 is similarly clamped (Figs. 12A, 13 and 31) to a sleeve-like projection 634 of a hub 636 which is rockable on a shaft 638 fixed in the standard, the hub having an arm 640 provided with a pin 642 projecting into a slot (Figs. 12 and 12A) in the arm 604 so that rocking of the hub 636 will operate the ejector. The hub 636 carries a casing 644 (Fig. 14) containing a hollow plunger 646 urged downwardly by a coil spring 648 backed up by an adjusting plug 650. The plunger engages an adjusting screw 652 in an offset lug 654 on a rockable hub 656 (Figs. 11, 13 and 32) having a sleeve like projection 658 rockably mounted on the fixed shaft 638 and also journalled in a bushing 660 near the upper end of a standard 662 which is bolted to the base plate. The hub 656 has a forwardly projecting arm 664 connected by a pivot pin 666 to an eye-bolt 667 threaded in the upper end of a piston rod 668 on a piston 670 in a cylinder 672 which is pivoted at 674 to the lug 478. The hub 656 has an offset lug 676 with an adjusting screw 678 normally spaced from an abutment face 680 on the casing 644. A cam 682 on the arm 664 retracts a gauge as will appear.

When the piston 670 is held downwardly in the cylinder by fluid pressure, the lug 654 (Fig. 14) and its screw 652 are held stationary so that the coil spring 648 reacts upwardly on the casing 644 and so urges the arms 640 and 628 downwardly. The pressure idler roller is thus yieldingly held down upon the work and the ejector is in a lowered or inoperative position. When the piston is forced upwardly, the arm 664 is raised and the lug 654 is lowered, the spring 648 gradually losing tension but temporarily holding the pressure idler roller against the work until the screw 678 engages the abutment face 680 and positively lifts the pressure idler roller and the arm 640. This lost motion provides for operation of the cam 682 to retract a gauge before the work is released and ejected.

To take the axial thrust on the work-piece during grinding, the work is arranged to abut against the end of a thrust wheel or roller 684 (Figs. 13 and 26) which is secured by a screw 686 and a key pin 688 to a rotary shaft 690. The shaft is journalled for rotation in ball bearings 692 carried by a housing 694 having a threaded portion 696 engaging interior threads in a supporting sleeve 698 having a flange 700 secured by screws 702 to the standard 452. A lock nut 704 locks the housing 694 in axially adjusted position with a portion of the thrust wheel 684 housed in a recess in the standard. In order to locate or adjust the regulating roller 522 and the supporting idler roller 560 for work of different sizes and thus have all work centers in the same axis, a set-up dummy 706 is temporarily supported on the thrust roller concentric with its established axis by a flange 708 fitting a recess of the roller. The set-up dummy has the same diameter as the work to be ground and the regulating roller with its supporting head 538 and the supporting idler roller with its supporting head 580 are then swung about their pivot shafts until the rollers engage the dummy. The pivoted heads are then clamped in their adjusted positions and the dummy is removed so that the corresponding work will eventually be supported concentric with the thrust roller and no rubbing will occur.

A skeleton gauge lever 710 (see Figs. 12, 12B, 13 and 15) is secured to a hinge plate 712 having ball bearings 714 engaging coned surfaces on an upper pintle 716 and a lower pintle 718, the pintle 716 being threaded in one of the supporting lugs 500 and the pintle 718 being slidable in the other lug and urged upwardly by a coil spring 720. The gauge lever has a yoke portion providing an opening 722 for the grinding wheel to enter the work. Two feelers 724 provided with diamonds project laterally from the yoke into the work-piece and engage the internal surface of the work. As will appear, the gauge lever is spring pressed towards the work so that the feelers press axially of the work. If the work surface is slightly tapered, an amplified axial movement of the feelers will occur in response to a small change in diameter and this axial movement is further amplified by making the outer end of the gauge lever control electric contacts. When the work surface is spherical, as illustrated, the feelers are preferably made to engage the surface at opposite points near a great circle in order to take advantage of the slight taper and the minimum change in diameter for a given axial movement. The gauge will of course operate as a comparator if the feelers are not in the vertical center of the piece.

A bar 726 (Figs. 11, 12, and 13) is loosely pivoted near one end of the gauge lever by a screw 727, the bar being rounded under the head of the screw so that the joint has a little motion to avoid cramping. The bar is riveted at its upper end to a rod 728 which is slidable freely in a guide bushing 730 pressed into a hole in the standard. The rod can also turn slightly to avoid cramping. A coil spring 732 is interposed between the standard and a washer which is backed up by a nut 734 and a thimble or cap 736 which are threaded on the rod. The thimble or cap has a rounded head serving as a cam follower for the cam 682 so that when the arm 664 is lifted the cam will retract the gauge feelers from the work. The end portion of the gauge lever carries spaced adjusting screws 738 abutting against leaf springs 740 which have their lower ends clamped in slits of a clamping block 742, fastened to the standard. The upper ends of the leaf springs are riveted to plungers 744 and 746 which slide through holes in the standard to operate in sequence a pair of switches 748 and 750. The switches are mounted on an angle bracket 752 secured to the standard.

In order to dress off the grinding wheel when the work nears finished size, a dressing tool 754 is threaded in a cross bar 756 of the gauge lever, the dressing tool being located in a continuation of the spherical work surface so that it will oscillate across the wheel when the work head changes its field of oscillation as before described.

Work-pieces are fed from a magazine 760 (Fig. 12) supported on the standard and terminating between the regulating roller and the pressure idler roller, the magazine having an arcuate bottom wall 762 close to the regulating roller and co-operating with an arcuate baffle plate 764 lying close to the pressure idler to hold the lowermost piece. The baffle plate 764 is secured to the arm 628 so that it is lifted with the pressure idler to let the lowermost piece drop onto the ejector 613 when the latter has ejected a finished piece. To protect the bearings of the pressure idler roller, a thin water guard 766 closes the elongated opening 486 in the standard, this guard fitting around the wheel housing and being guided by screws 768.

Fixed to the left hand standard 662 (Figs. 11, 13 and 18) are three switches 770, 772, and 774, the first two of the switches facing upwardly and lying inside of a switch supporting plate 776 while the third switch faces downwardly and is outside of the plate 776. Switches 770 and 774 normally tend to open while switch 772 normally tends to close. An arm 778 carrying a spring pressed plunger 779 is secured by a clamping screw 780 to the outer end of the rockable sleeve 658. The arm and the plunger are arranged to swing up to close the switch 774 when the sleeve 658 and its piston operated arm 664 are rocked to effect the lifting of the pressure idler roller and to eject the finished work. Another arm 782 is similarly clamped to the sleeve and carries a spring pressed plunger 784 holding the switch 772 open when the arm is down but acting to release and thereby close the switch 772 when the arm swings up with the rockable sleeve. A third arm 786 surrounds the sleeve 658 and is frictionally engaged with the arm 782 by coil springs 788 pressing laterally against a friction washer 790 which is secured to the arm 786 by a pin 792. The arm 786 holds the switch 770 closed when the arm is down but releases and opens the switch when it rises to engage an adjustable stop screw 794 carried by a lug 796 on the standard 662. Due to the stop screw, the arm 786 swings up a shorter distance than the next arm 782. The arm 786 is thus left behind the arm 782 as the arms swing upwardly and, upon subsequent swinging down of the arm 782, as when the pressure idler roller is brought down upon a new work-piece, the arm 786 will move in advance of arm 782 and close the switch 770 while the arm 782 is still coming down to open the switch 772. Thus both switches are closed for a short interval, this being to operate a double throw switch, as will appear in the diagram, to reset the gauge circuits.

In order that the grinding wheel may be used to dress off or true the regulating roller or the supporting idler roller, the work head has means to locate it with the roller axes parallel to the grinding spindle. For this purpose a locking pin 800 (Fig. 11) is arranged to engage a hole 802 in the frame, the pin being slidably mounted in a bracket 804 secured to the plate 450. The grinding wheel head has similar mechanism to locate it, as shown in Fig. 5. In order that the grinding wheel may be dressed when the gauge is removed and not in use, an auxiliary wheel dressing diamond may be mounted on a bracket 806 (Fig. 13) whose base is slotted and adjustably secured by screws to the base plate 450. All of the parts on the work head to one side of the standard or face plate 452 are preferably enclosed and protected by a cover or casing 808 (Fig. 11) secured by clamping screws 810 to the lugs 498.

As shown in the diagram, the link lengthening cylinder 58 is controlled by a valve 900 having flexible pipes 902 and 904 connected to opposite ends of the cylinder. The valve is actuated in opposite directions by solenoids 906 and 908. The piston rod 202 which actuates the oscillating grinding wheel unit is controlled by a valve 910 having flexible pipes 912 and 914 connecting it to the cylinder 206. The valve 910 is actuated in opposite directions by solenoids 916 and 918. The piston 670 which actuates the pressure idler roller and associated mechanism is controlled by a valve 920 connected to the cylinder by pipes 922 and 924. The valve 920 is actuated in opposite directions by solenoids 926 and 928. The piston 356 which controls the ratchet feed mechanism is controlled by a valve 930 connected to the cylinder by a single pipe 932 which is alternately a pressure line and an exhaust line, the spring 360 pressing the piston downwardly. The valve 930 is actuated in opposite directions by solenoids 936 and 938.

Power from a 110 volt line comes in through a push button starting switch 940 and a stopping switch 942 to a double throw switch 944 actuated in opposite directions by solenoids 946 and 948 and adapted to alternately engage contacts 950 and 952, the former being connected to three wires 954, 956 and 958. The wires 954 and 956 have connection with a time relay switch 960 of well known type which has a wire 962 leading to the roughing gauge switch 748 one terminal of which is grounded. The coil of the switch operating solenoid 946 is connected to the time relay switch by a wire 964 and is also connected to the solenoid 908 by a wire 966. The contact 952 is connected to the solenoid 918, and a branch wire 968 connects the contact 952 with the solenoids 376, 926 and 928. The time relay switch controls the period of wheel dressing and thus controls the number of oscillations which the dressing tool makes across the grinding wheel when the above described change occurs in the place of oscillation of the work head.

In operation, assuming a work piece W is being supported and rotated by the rollers on the work head, the grinding wheel is swung into the work through the gauge opening 722 until the arm 222 is stopped by the feed screw 226. The grinding wheel is then about to make contact with the work which is being oscillated around a vertical axis in line with the center of curvature of the surface to be ground. The oscillating work head unit actuates the pawl and ratchet feed mechanism and the feed screw slowly recedes to control the in-feed of the grinding wheel. The gauge feelers follow the work surface and, when the piece is nearly to size, the roughing gauge switch 748 makes contact. Current from the double-throw switch 944 then flows through wire 956 to the time relay switch 960 and also through the wire 954 to actuate the solenoid 906 to shift the valve 900 to the right. The link-lengthening piston rod 54 is thus actuated to change the field of work head oscillation and this causes the dressing tool to oscillate across the grinding wheel. During dressing, the feed mechanism is idle because the feed cam 384 is turned to bring its arcuate surface under the cam roller 382. As the piston rod 54 is actuated, the arm 52 controls closing of the switch 64 so that current through the wire 958 will actuate the solenoid 936. This shifts the valve 930 to the left and raises the piston 356 and the pawl controlling cam 350 to reduce the subsequent stroke of the feed pawl. When the time limit switch 960 swings over and breaks the circuit in the solenoid 906, current flows through both of the solenoids 946 and 908 to the wire 964 and the time limit switch. The double throw switch 944 is thus thrown over by its solenoid 946 to the contact 952 to make ready for operation of the second gauge switch 750. Solenoid 908 returns the valve 900 and the piston rod 54 to starting position so that the work head unit resumes its former position of oscillation, causing the ratchet mechanism to again become active at a slower rate of feed and opening the switch 64.

Grinding proceeds with a fine feed until the second or finish gauge switch 750 makes contact. Current from the double throw switch 944 and its contact 952 then flows to the solenoid 918 and shifts the valve 910 to the right thereby causing the wheel to swing out of the work. The solenoid 376 is also actuated through the branch wire 968 to swing hinged bracket 364 out of the path of the cam-carrier 352 so that the feed mechanism becomes inoperative. The arm 440 on the wheel head unit actuates the compensating ratchet wheel 410 to reverse the feed screw and compensate for stock removal. The arm 210 which moves with the wheel head actuating piston closes the switches 214 and 215. Switch 214 controls operation of the solenoid 926 to shift the valve 920 to the left and the piston 670 is raised. This actuates the work head arm 664 having the cam 682 which swings the gauge feelers out of the work and so breaks the contact at the gauge switches 748 and 750. When the gauge contact 750 is broken, the solenoids 918, 376 and 926 are de-energized. When the lost motion is taken up between the arm 664 and the hub 636 the pressure idler roller 620 is lifted and the work is ejected by the ejector 613. As the arms 778, 782 and 786 are raised, the switch 770 opens, the switch 772 closes, and finally the switch 774 is closed. When switch 774 closes, current going from the double throw switch contact 952 through the wire 968 actuates the solenoid 928 whereby the valve 929 is immediately shifted back and the piston 670 descends so that the ejector lowers a new piece down onto the supporting rollers from the magazine and the pressure idler roller 620 descends on the work. The gauge feelers are then swung into the work as the cam 682 and its arm 664 reach their lower position.

As the piston 670 starts down, the arm 778 lets the switch 774 open first and then the switch 770 is closed just before the switch 772 is opened, due to the advance or lead of the switch operating arm 786 with respect to the arm 782. Thus a circuit is completed momentarily through the switches 770 and 772 so that the solenoids 948 and 916 are actuated, the first of these restoring the double throw switch 944 to starting position on the contact 950 and the second actuating the valve 910 to control swinging of the grinding wheel into the work. As the grinding wheel unit starts to swing, the switch 215 stays closed for an instant. Hence current from the double throw switch contact 950 flows through the wire 958 to the solenoid 938 and pulls the valve 930 to the right so that the feed control piston 356 will descend by spring pressure. Grinding then proceeds on the new piece as before.

We claim:

1. In a machine of the character indicated, a work head, a tool head, mechanism including an actuating link for oscillating one of the heads in a predetermined field, said link comprising a cylinder and piston having a constant relation during said oscillation in the predetermined field, and means for shifting the piston in the cylinder to change the location of the field of oscillation; substantially as described.

2. In a machine of the character indicated, a work head, a tool head, mechanism including an actuating link for oscillating one of the heads in a predetermined field, said link comprising a cylinder and piston having a constant relation during said oscillation in the predetermined field, means for shifting the piston in the cylinder to change the location of the field of oscillation, and means for setting the stroke of the piston to control the distance between the two fields of oscillation; substantially as described.

3. In a machine of the character indicated, a work head, a tool head, mechanism including an actuating link for oscillating one of the heads in a predetermined field, said link comprising a cylinder and piston having a constant relation during said oscillation in the predetermined field, means for shifting the piston in the cylinder to change the location of the field of oscillation, a piston rod, nuts threaded on the piston rod, and a bar secured to the cylinder and projecting between the nuts; substantially as described.

4. In a machine of the character indicated, a work head, a tool head, means for effecting a feed between the tool and the work, mechanism including an actuating link for oscillating one of the heads in a predetermined field, said link being extensible to change the location of the field of oscillation, and means operated by extension of the link to control a change in the subsequent feed between the tool and the work; substantially as described.

5. In a machine of the character indicated, a work head, a wheel head having a grinding wheel, a dressing tool carried by the work head, mechanism having an actuating link for oscillating one of the heads in a predetermined field to cause traversing engagement between the wheel and the work, said link comprising a cylinder and piston having a constant relation during said oscillation, and means for shifting the piston in the cylinder to change the location of the field of oscillation to cause a relative traversing engagement between the dressing tool and the grinding wheel; substantially as described.

6. In a machine of the character indicated, a work head, a wheel head having a grinding wheel, a dressing tool carried by the work head, mechanism for oscillating one of the heads in a predetermined field to cause traversing engagement between the wheel and the work and means comprising an extensible link in the oscillating mechanism for changing the location of the field of oscillation to separate the wheel and the work and cause a relative traversing engagement between the dressing tool and the grinding wheel; substantially as described.

7. In a machine of the character indicated, a work head, a wheel head having a grinding wheel, means for oscillating one of the heads in a predetermined field to cause traversing engagement between the work and the wheel, a dressing tool carried by the work head, means for changing the field of oscillation to separate the work and the wheel and to effect relative oscillating engagement between the dressing tool and the grinding wheel, and a timing device to control the period of oscillation in the changed field; substantially as described.

8. In a machine of the character indicated, a work head, a wheel head having a grinding wheel, means for oscillating one of the heads in a predetermined field to cause traversing engagement between the work and the wheel, a gauge lever having a feeler engaging the work surface, a dressing tool mounted upon the gauge lever, and means for swinging the oscillated head to another field of oscillation to cause traversing engagement between the wheel and the dressing tool; substantially as described.

9. In a machine of the character indicated, a work head, a wheel head having a grinding wheel, means for oscillating one of the heads around an axis to generate a curved surface on a workpiece, a gauge lever having a feeler engaging the work surface, a dressing tool mounted on the gauge lever in the geometric continuation of the work surface, and means for changing the field of oscillation to separate the wheel and the work and to cause traversing engagement between the wheel and the dressing tool; substantialy as described.

10. In a machine of the character indicated, a work head, a tool head, mechanism for oscillating one of the heads in a predetermined field to cause traversing engagement between the work and the tool, a feed cam oscillated by said mechanism for effecting feed steps between the tool and the work, and mechanism for causing a change in the location of the field of oscillation to separate the work and the tool and to move the cam to inoperative position; substantially as described.

11. In a machine of the character indicated, a work head, a wheel head having a grinding wheel, mechanism for oscillating one of the heads in a predetermined field to cause traversing engagement between the work and the wheel, a feed cam having an operative portion and an idle portion, gearing having operative connection with the oscillated head for oscillating the cam to produce feed steps between the wheel and the work, and mechanism for causing a change in the field of oscillation of the oscillated head and the cam; substantially as described.

12. In a machine of the character indicated, a work head, a wheel head having a grinding wheel, mechanism for oscillating one of the heads in a predetermined field to cause traversing engagement between the work and the wheel, a feed cam oscillated by said mechanism for effecting feed steps between the wheel and the work, a dressing tool on the work head, mechanism for causing a change in the location of the field of oscillation to cause oscillating engagement between the dressing tool and the wheel and to move the feed cam to inoperative position; substantially as described.

13. In a machine of the character indicated, a head having a spindle with a driven pulley, means for oscillating the head around an axis, an arm oscillating with the head and having a pulley offset from the axis of oscillation, a shaft connected to the last named pulley and journalled in the arm, a belt drive between the pulleys, the shaft passing through the axis of oscillation, and a drive pulley secured to the shaft and mounted with its geometric center in said axis of oscillation; substantially as described.

14. In a machine of the character indicated, a head having a driven spindle, means for oscillating the head around an axis, an arm oscillating with the head and offset from the axis of oscillation, a drive shaft journalled in the arm and having a drive member mounted with its center in the axis of oscillation, a second drive member mounted with its center in the axis of oscillation, a flexible driving device extending around the drive members and having its opposite runs substantially equally spaced from the axis of oscillation and extending lengthwise of the latter upon opposite sides thereof, and means offset from the axis of oscillation for connecting the drive shaft to the driven spindle; substantially as described.

15. In a machine of the character indicated, a frame, a head having a driven spindle, a shaft journalled in the frame and connected to the head, a trunnion journalled in alignment with the shaft and spaced therefrom, an arm having connection with the trunnion and the shaft, means for oscillating the shaft and the trunnion around their common axis, a drive shaft journalled in the arm and having a driving member mounted between the trunnion and the oscillated shaft, a flexible driving device extending around the driving member and straddling the trunnion, and means offset from the axis of oscillation for connecting the drive shaft to the driven spindle; substantially as described.

16. In a machine of the character indicated, a frame, a pair of substantially parallel shafts journalled for oscillation in the frame, a work head mounted on one shaft and a wheel head mounted on the other shaft, means for oscillating one of the shafts around its axis to cause relative traversing engagement between the wheel and the work, and means for oscillating the other shaft around its axis to cause the wheel and the work to have relative approach and recession to effect cutting feed and retraction; substantially as described.

17. In a machine of the character indicated, a work head and a wheel head, the work head having means to support and rotate a hollow work piece on its axis for internal grinding, means for oscillating the work head around an axis to cause traversing engagement between the wheel and the work, and means for oscillating the wheel head around an axis to swing the wheel into and out of the work-piece; substantially as described.

18. In a machine of the character indicated, a work head and a wheel head, means for oscillating one of the heads around an axis to cause relative traversing engagement between the wheel and the work, means for swinging the other head around an axis to cause relative approach between the wheel and the work, and a rotatably driven screw for controlling the final stage of the swinging movement of approach and the cutting feed; substantially as described.

19. In a machine of the character indicated, a work head and a wheel head, means for oscillating one of the heads around an axis to cause relative traversing engagement between the wheel and the work, a cylinder and piston unit for swinging the other head around an axis to cause rapid and close relative approach between the wheel and the work, and a receding stop for arresting the rapid movement and controlling a subsequent slow advance; substantially as described.

20. In a machine of the character indicated, a work head and a wheel head, means for oscillating one of the heads around an axis to cause relative traversing engagement between the wheel and the work, means for swinging the other head around an axis to cause relative approach between the wheel and the work, a receding stop for controlling the final stage of the swinging movement, and means operated by the oscillating head for effecting a step by step recession of the stop; substantially as described.

21. In a machine of the character indicated, a work head and a wheel head, means for oscillating one of the heads around an axis to cause relative traversing engagement between the wheel and the work, means for swinging the other head around an axis to cause relative approach between the wheel and the work, a receding stop for controlling the final stage of the swinging movement, means operated by the oscillating head for effecting a step by step recession of the stop, and means for changing the field of oscillation of the oscillating head to separate the work and the wheel and to arrest the movement of the receding stop; substantially as described.

22. In a machine of the character indicated, a work head and a wheel head, means for oscillating one of the heads around an axis to cause relative traversing engagement between the wheel and the work, means for oscillating the other had around an axis to cause the wheel and the work to have relative approach and recession, a receding stop for controlling the final approaching movement while the work and the wheel are in contact, and means for reversing the movement of the stop to compensate for stock removal; substantially as described.

23. In a machine of the character indicated, a work head and a wheel head, means for oscillating one of the heads around an axis to cause the wheel and the work to have relative approach and recession, a receding stop for controlling the final approaching movement while the work and the wheel are in contact, and means operated by the separation of the wheel and the work for resetting the stop to compensate for stock removal; substantially as described.

24. In a machine of the character indicated, a work head and a wheel head, means for oscillating one of the heads around an axis to cause relative traversing engagement between the wheel and the work, means for swinging the other head around an axis to cause relative approach between the wheel and the work, a rotating screw operated by the oscillation of the first named head for controlling the final stage of the swinging movement, and means operated by a reversed swinging of said other head for reversing the screw to compensate for stock removal; substantially as described.

25. In a machine of the character indicated, a head, a shiftable screw receding axially during rotation for controlling advance of the head, a drive gear splined to the screw to provide for shifting of the screw therein, a sun gear surrounding the screw, planet pinions connecting the gears, a casing supporting the planet pinions, means for rotating the casing to cause the screw to recede at slow speed axially with respect to the gears and the casing, mechanism for holding the sun gear from rotation during said axial recession of the screw, and means for rotating the sun gear to reset the screw; substantially as described.

26. In a machine of the character indicated, a work head and a wheel head, means for oscillating one of the heads around an axis to cause the wheel and the work to have relative approach and recession, a receding screw for controlling the final approaching movement while the work and the wheel are in contact, gearing for driving the screw at slow speed and including a sun gear anchored from rotation in one direction, and ratchet mechanism operated by swinging of the head for turning the sun gear in the opposite direction to reset the screw; substantially as described.

27. In a machine of the character indicated, a head, ratchet mechanism for controlling movement of the head and comprising a ratchet wheel, a reciprocating slide bar, a pawl pivoted to the bar, a cam for controlling pivotal movement of the pawl as the slide bar is reciprocated, a plunger for shifting the cam to decrease the effective movement of the pawl on the ratchet wheel, and means for arresting the shifting movement of the cam at a selected position; substantially as described.

28. In a machine of the character indicated, a head, ratchet mechanism for controlling movement of the head and comprising a ratchet wheel, a reciprocating slide bar, a pawl pivoted to the bar, a cam for controlling pivotal movement of the pawl as the slide bar is reciprocated, a plunger for shifting the cam to decrease the effective movement of the pawl on the ratchet wheel, means comprising a movable stop for arresting the movement of the cam at a selected position, and means for shifting the stop out of arresting position; substantially as described.

29. In a machine of the character indicated, a head, ratchet mechanism for controlling movement of the head and comprising a ratchet wheel, a reciprocating bar, a pawl pivoted to the bar, a cam for controlling pivotal movement of the pawl, a plunger for shifting the cam, means comprising a movable stop for arresting the movement of the cam at a selected position, and a work sizing device for controlling shifting movements of the cam and a movement of the stop out of arresting position; substantially as described.

30. In a machine of the character indicated, a head comprising a plurality of rollers for supporting and rotating a round work-piece, a mounting for moving each roller bodily towards or from an established axis, a demountable dummy piece corresponding to each size of work-piece, a thrust roller having means to support the selected dummy piece concentric with said established axis and in the path of the movable rollers, and means for securing each mounting in its adjusted position whereby all sizes of work will have support for rotation around said established axis.

31. In a machine of the character indicated, a head comprising a plurality of rollers for supporting and rotating a round work-piece, a mounting for moving each roller bodily towards or from an established axis, demountable locating means corresponding to each size of work-piece and adapted for support in concentric relation to said established axis for locating the mountings with respect to said established axis, and means for securing the mountings in their located positions to provide for rotation of work-pieces of different diameters selectively in the same relation to said established axis.

32. In a machine of the character indicated, a head comprising a plurality of rollers for supporting and rotating a round work-piece, a mounting for swinging each roller bodily around an axis towards or from an established axis, a demountable dummy piece for each size of work, and means for locating and supporting the selected dummy piece in said established axis to locate the swinging rollers by peripheral contact with said dummy piece.

33. In a machine of the character indicated, a head comprising a plurality of rollers for supporting and rotating a round work-piece, a mounting for moving each roller bodily towards or from an established axis, a locating member, and means for supporting the locating member concentric with the established axis for locating the mountings so that the peripheries of the rollers are equidistant from the axis whereby the work-piece will be supported for rotation about said established axis; substantially as described.

34. In a machine of the character indicated, a head comprising a plurality of rollers for supporting and rotating a round work-piece, a mounting for adjusting each roller bodily towards or from an established axis, a roller locating member having means independent of the rollers to support it concentric with said established axis, means for fixing each mounting with the rollers located by the member at equal distances from the established axis, and a thrust roller mounted to rotate around said axis; substantially as described.

35. In a machine of the character indicated, a head comprising a plurality of rollers for supporting and rotating a round work-piece, each roller having a pivoted supporting arm, bearing means carried by each arm for rotatably supporting the rollers, and a standard forming a barrier between the rollers on the one hand and the supporting arms and the bearing means on the other; substantially as described.

36. In a machine of the character indicated, a head comprising a plurality of rollers for supporting and rotating a round work-piece, housings having bearings for rotatably supporting the rollers, each housing having a pivoted supporting arm, a standard having elongated slots into which the housings project, and the rollers being on one side of the standard and the arms upon the other; substantially as described.

37. In a machine of the character indicated, a head comprising a plurality of rollers for supporting and rotating a round work-piece, bearings for rotatably supporting the rollers, a standard, and the rollers overhanging from one side of the standard and the bearings being on the other side with the standard forming a barrier between them; substantially as described.

38. In a machine of the character indicated, a head comprising a plurality of rollers for supporting and rotating a round work-piece, a thrust roller offset from the plane of the supporting rollers, a housing in which the thrust roller is journalled for rotation, a sleeve supporting the housing for axial movement and having a threaded portion, and the housing having a co-operating threaded portion to effect axial shifting thereof and of the thrust roller and work-piece; substantially as described.

39. In a machine of the character indicated, a head comprising a plurality of rollers for supporting and rotating a round work-piece, a rock shaft extending through one of the rollers, an ejector having an arm secured to the rock shaft, a pressure roller having a rockable mounting, means for rocking the pressure roller to release the piece, and pivotally connected arms, one secured to the rockable mounting and the other secured to the ejector shaft for operating the ejector; substantially as described.

40. In a machine of the character indicated, a head comprising a driven roller and an idler roller for supporting and rotating a round work-piece, a rock shaft extending through the idler roller, an ejector having an arm secured to the rock shaft, a pressure roller, means for raising the pressure roller away from the idler roller to provide a work discharge space therebetween, and connections between the raising means and the other end of the rock shaft for swinging the ejector into the discharge space; substantially as described.

41. In a machine of the character indicated, a head comprising a plurality of rollers for supporting and rotating a round work-piece, a gauge mounted to move towards or from the rollers to bring the gauge into or out of operative relation to the work-piece, a rocking member having an actuating arm and a gauge-shifting cam, a work ejector, and a lost motion connection between the arm and the ejector to provide for camming of the gauge away from the work prior to actuation of the ejector; substantially as described.

42. In a machine of the character indicated, a head comprising a plurality of rollers for supporting and rotating a round work-piece, a gauge mounted to move towards or from the rollers to bring the gauge into or out of operative relation to the work-piece, a rocking member having an actuating arm and a gauge-shifting cam, a pressure roller mounted to swing towards or from the work-piece, and a lost motion connection between the arm and the pressure roller mounting to provide for camming of the gauge away from the work prior to release of the work; substantially as described.

43. In a machine of the character indicated, a head comprising a plurality of rollers for supporting and rotating a round work-piece, a gauge mounted to move towards or from the rollers to bring the gauge into or out of operative relation to the work-piece, a rocking member having an actuating arm and a gauge-shifting cam, a pressure roller mounted to swing towards or from the work-piece, a work ejector operatively connected with the pressure roller mounting, and a lost motion connection between the arm and the pressure roller mounting to provide for camming the gauge away from the work prior to release or ejection of the work; substantially as described.

44. In a machine of the character indicated, a head comprising a plurality of rollers for supporting and rotating a round work-piece, a gauge lever hinged to the head and extending alongside the ends of the rollers, a feeler projecting from the lever to engage the work or retreat therefrom when the lever swings, a rod having connection with the lever and having a cam follower, a rocking member having an arm, and a cam on the arm to engage the follower for retracting the feeler from the work-piece; substantially as described.

45. In a machine of the character indicated, a head comprising a plurality of rollers for supporting and rotating a round work-piece, a gauge lever hinged to the head and extending alongside the ends of the rollers, a feeler projecting from an intermediate point on the lever to engage the work or retreat therefrom, a rod having connection with the lever and having a cam follower, a spring for actuating the rod to urge the feeler into operative relation to the work-piece, a rocking member having an arm, and a cam on the arm to engage the follower for shifting the feeler in opposition to the spring; substantially as described.

46. In a machine of the character indicated, a head comprising means for supporting and rotating a hollow work-piece, a gauge lever mounted alongside of the work supporting means and having feelers to engage the work surface, the gauge lever having an opening leading to the work surface, and a grinding wheel adapted to pass through said opening; substantially as described.

47. In a machine of the character indicated, a head comprising means for supporting and rotating a hollow work-piece, a gauge lever extending across the end of the piece, feelers projecting from the lever into the piece, the gauge lever having an opening leading to the interior of the piece, a grinding wheel adapted to pass through the opening, and a wheel dressing tool mounted near one end of the opening; substantially as described.

48. In a machine of the character indicated, a head having a face plate, a plurality of rollers overhanging from the face plate to rotatably support a round work-piece, a gauge lever mounted alongside of the rollers and having a hinged connection with the face plate, and means for swinging the gauge towards or from the work-piece; substantially as described.

49. In a machine of the character indicated, a head having a face plate, a plurality of rollers overhanging from the face plate to rotatably support a round work-piece, a gauge lever mounted alongside of the rollers and having a movable mounting upon the face plate, a spring for urging the gauge substantially axially of the work-piece, and means on the lever for controlling a machine control circuit; substantially as described.

50. In a machine of the character indicated, a work head having a gauge shiftable into or out of operative relation to the work, gauge shifting mechanism, a piston for actuating the gauge shifting mechanism, a valve controlling the piston, a switch controlling the valve, and means controlled by movement of the piston for operating the switch to control reverse movement of the piston and the gauge shifting mechanism; substantially as described.

51. In a machine of the character indicated, a work head having a gauge shiftable into or out of operative relation to the work, gauge shifting mechanism and work shifting mechanism on the head, a piston for operating the shifting mechanisms to retract the gauge from the work and to remove the work from the head, a valve controlling the piston, a switch controlling the valve, and means controlled by movement of the piston for operating the switch to control a reverse movement of the shifting mechanisms to load a work-piece upon the head and shift the gauge into operative relation to the new work-piece; substantially as described.

52. In a machine of the character indicated, a work head having work shifting mechanism, a piston for operating the work shifting mechanism, a switch controlling the piston, a wheel head having a grinding wheel, a piston for shifting the wheel head, a switch controlling the last named piston, and means controlled by movement of the first named piston for operating both of the switches; substantially as described.

53. The method of setting up work supporting rollers with respect to a thrust roller to locate round work of various selected diameters for rotation on the same axis as the thrust roller, which consists in first supporting a dummy piece of the selected work diameter upon the thrust roller concentric therewith, locating the work supporting rollers at equal distances from the thrust roller axis by adjusting them into peripheral contact with said dummy piece, and removing the dummy piece; substantially as described.

54. The method of setting up work supporting rollers to locate round work of various selected diameters for rotation around an established axis, which consists in first locating a dummy piece of the selected work diameter concentric with said established axis, locating the supporting rollers at equal distances from said axis by adjusting them into peripheral contact with said dummy piece, and removing the dummy piece; substantially as described.

RAYMOND H. CRAMER.
PHILIP H. HUTCHINSON.